United States Patent
Sun et al.

(10) Patent No.: US 12,335,204 B2
(45) Date of Patent: Jun. 17, 2025

(54) WIRELESS LOCAL AREA NETWORK FULL-DUPLEX ENHANCEMENTS FOR SCENARIOS WITH MULTIPLE ACCESS-POINTS / BSS

(71) Applicants: SONY GROUP CORPORATION, Tokyo (JP); SONY CORPORATION OF AMERICA, New York, NY (US)

(72) Inventors: Li-Hsiang Sun, San Jose, CA (US); Mohamed Abouelseoud, Burlingame, CA (US); Liangxiao Xin, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 476 days.

(21) Appl. No.: 17/814,450

(22) Filed: Jul. 22, 2022

(65) Prior Publication Data

US 2023/0055895 A1    Feb. 23, 2023

Related U.S. Application Data

(60) Provisional application No. 63/260,455, filed on Aug. 20, 2021.

(51) Int. Cl.
*H04L 5/16*          (2006.01)
*H04L 5/00*          (2006.01)
(Continued)

(52) U.S. Cl.
CPC ............. *H04L 5/16* (2013.01); *H04L 5/0048* (2013.01); *H04W 56/0035* (2013.01); *H04W 84/12* (2013.01)

(58) Field of Classification Search
CPC ....... H04L 5/16; H04L 5/0048; H04L 5/0051; H04L 1/1671; H04L 1/1685;
(Continued)

(56) References Cited

U.S. PATENT DOCUMENTS

| 2017/0055255 A1 | 2/2017 | Zhou |
| 2020/0077351 A1 | 3/2020 | Porat |
| 2021/0199540 A1 | 7/2021 | Fazecas |

FOREIGN PATENT DOCUMENTS

| CN | 113016155 | 6/2021 |
| EP | 2317687 B1 | 6/2013 |

(Continued)

OTHER PUBLICATIONS

Horia Vlad Balan et al: "AirSync", IEEE /ACM Transactions on Networking, IEEE / ACM, Dec. 1, 2013 (Dec. 1, 2013), vol. 21, No. 6, pp. 1681-1695, New York, NY, US.

(Continued)

*Primary Examiner* — Dady Chery
(74) *Attorney, Agent, or Firm* — O'BANION & RITCHEY LLP; John P. O'Banion

(57) ABSTRACT

Full-duplex (FD) enhancements for three scenarios with multiple APs/BSSs. (1) Multiple-AP joint transmissions on a WLAN. Toward eliminating self-interferences and other issues, certain pilot signals in the PPDU are transmitted only by the primary AP. One or more secondary APs participating in the joint transmission receive the pilots to correct their clock in the following symbols. (2) Communications are performed with extended OFDM symbols sent on a second channel which facilitate NAV decoding for stations transmitting on a first channel. (3) More than one AP can perform a joint Ack/BA to a UL PPDU. The secondary AP may utilize its full duplex capability to determine the difference (Continued)

of receiving status between itself and the primary AP, and forward data to the primary which it had not received.

11 Claims, 17 Drawing Sheets

(51) Int. Cl.
*H04W 56/00* (2009.01)
*H04W 84/12* (2009.01)

(58) Field of Classification Search
CPC ... H04L 1/1854; H04L 5/0055; H04L 1/1621; H04L 2001/0097; H04W 56/0035; H04W 84/12; H04W 72/0446; H04W 72/21; H04B 7/024
See application file for complete search history.

(56) References Cited

FOREIGN PATENT DOCUMENTS

| | | |
|---|---|---|
| EP | 3651425 | 5/2020 |
| WO | 2020097444 | 5/2020 |
| WO | WO-2020097441 A1 | 5/2020 |
| WO | 2020149717 | 7/2020 |
| WO | WO-2020224784 A1 | 11/2020 |

OTHER PUBLICATIONS

Hyoungsoo Lim et al., "Short Initial Ranging Transmission for IEEE 802.16 OFDMA", IEEE Draft, Sep. 12, 03, pp. 1-7, vol. 802.16e, Piscataway NJ, XP017622734.

WIRELESS LOCAL AREA NETWORK FULL-DUPLEX ENHANCEMENTS FOR SCENARIOS WITH MULTIPLE ACCESS-POINTS / BSS

CROSS-REFERENCE TO RELATED APPLICATIONS

This application claims priority to, and the benefit of, U.S. provisional patent application Ser. No. 63/260,455 filed on Aug. 20, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to Wireless Local Area Networks (WLANs) under IEEE802.11, and more particularly to enhancements utilizing Full Duplex (FD) communications in systems containing multiple Access Points (APs).

2. Background Discussion

Recent IEEE802.11be amendments are being enhanced for delay sensitive applications which support multiple links and multiple APs.

However, underlying these enhancements are half-duplex operating assumptions which can limit overall system efficiency.

Accordingly, a need exists for enhanced WLAN protocols which can also optimize efficiency when full-duplex communications are being utilized. The present disclosure overcomes those shortcomings and provides additional benefits over existing protocols.

BRIEF SUMMARY

A WLAN protocol which improves the use of Full-Duplex (FD) communication to facilitate scenarios with multi-APs. The present disclosure describes three methods of using Full Duplex (FD) operation to enhance wireless communication. One method can be applied to a secondary AP to correct its clock drift relative to the clock of a primary AP when performing a joint transmission from the two APs to a non-AP station. One method can be applied to facilitate multi-link operations on a single radio band when FD capability is available. One method/apparatus facilitates UpLink (UL) reception by multiple APs (primary and secondary) for diversity, and allows the secondary AP to acknowledge the UL reception independent of the receiving status of the primary AP and determine what information should be forwarded to the primary AP.

For the first method toward overcoming center frequency offset and symbol timing offset caused by the residual drift, certain pilot signals in the Physical layer Protocol Data Unit (PPDU) of a multiple-Access Point (AP) joint transmission are only allowed to be transmitted by the primary AP. The secondary APs participating in the joint transmission receives these pilot signals and utilizes them to correct its clock in the following symbols while performing joint transmission. One benefit of the present disclosure is that of overcoming residual clock drift issues that degrade performance between APs in a multi-AP joint transmission.

For the second method, neighboring channels (adjacent or non-adjacent) in a single radio band can be used to perform Simultaneous Transmit and Receive (STR) on both a primary channel (referred to herein as Ch1) and a secondary channel (referred to herein as Ch2). An initial message sent with extended Orthogonal Frequency Division Multiplexing (OFDM) symbol(s) on Ch2 is used to facilitate operation of Network Allocation Vector (NAV) decoding for STAs transmitting on Ch1. Single band Multi-Link Operations (MLOs) under this disclosure can require OFDM symbol alignment between neighboring channels as different links, but a simple alignment mechanism may not be suitable for all parties currently transmitting on the first channel to detect a new TXOP and its NAV on the second channel.

For the third method, more than one AP can perform a joint Acknowledgement (Ack) or Block Acknowledgement (Ack/BA) to an UpLink (UL) PPDU that is intended to a primary AP. The joint Ack/BA may be OFDMA, and a secondary AP may utilize its full duplex capability to determine the difference of receiving status between itself and the primary AP, and forwards the data, which was not received by the primary AP, but was received by itself, to the primary AP. A UL PPDU may be received by more than one AP and these APs perform a joint Ack. The secondary AP uses its full duplex capability to determine what has not been received by the primary AP, but has been received by itself, and forwards this data to the primary AP instead of requiring a non-AP to perform retransmission to the primary AP.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Station (STA) and Multi-Link Device (MLD) Hardware

Figure 1:
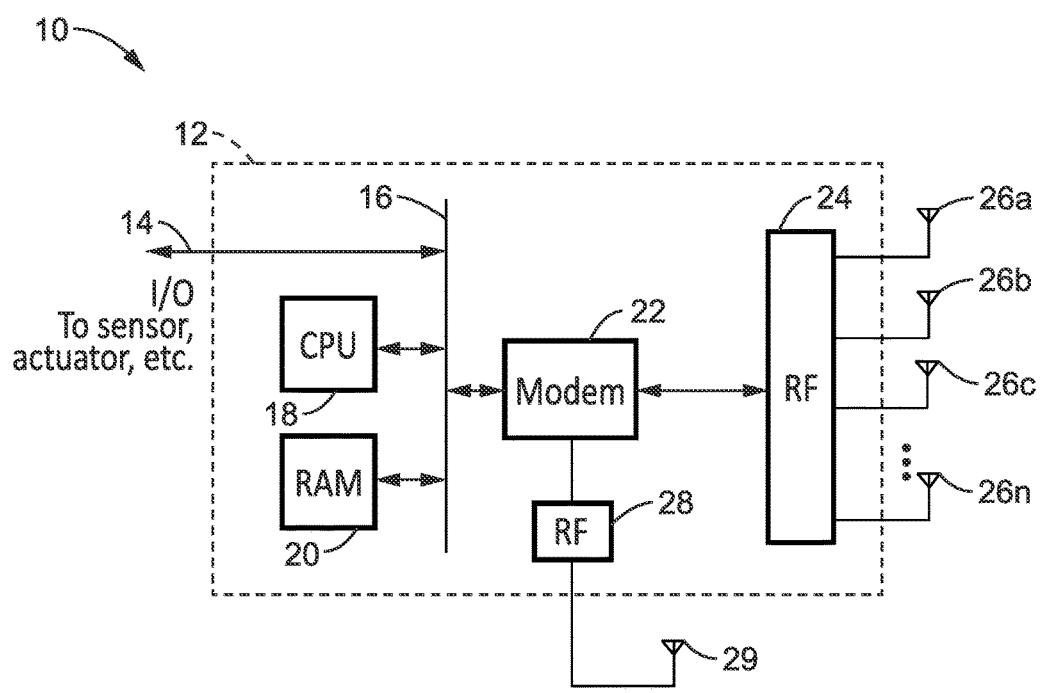
FIG. 1 is a hardware block diagram of wireless station (STA) hardware according to at least one embodiment of the present disclosure.

FIG. 1 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 2:
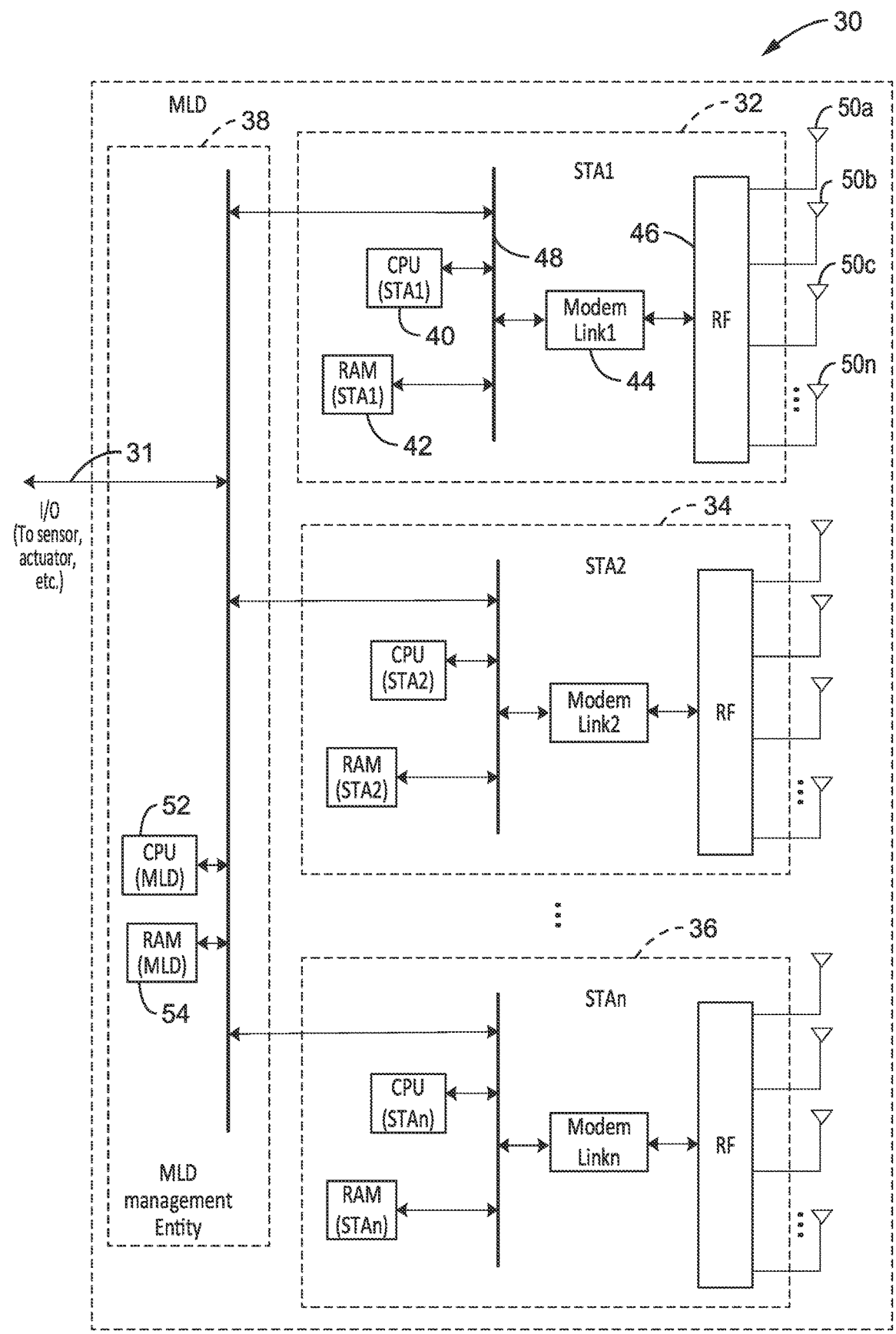
FIG. 2 is a hardware block diagram of a station configuration, such as contained in Multi-Link Device (MLD) hardware, according to at least one embodiment of the present disclosure.

FIG. 2 illustrates an example embodiment 30 of a multi-link device (MLD) hardware configuration. The MLDs may comprise a soft AP MLD, which is a MLD that consists of one or more affiliated STAs, which are operated as APs. A soft AP MLD should support multiple radio operations on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 38 having a CPU 52 and memory (e.g., RAM) 54 to allow executing a program(s) that implement communication protocols at the MLD level. The MLD can distribute tasks to, and collect information from, each affiliated station to which it is connected, exemplified here as STA1 32, STA2 34 through to STAN 36 and the sharing of information between affiliated STAs.

In at least one embodiment, each STA of the MLD has its own CPU 40 and memory (RAM) 42, which are coupled through a bus 48 to at least one modem 44 which is connected to at least one RF circuit 46 which has one or more antennas. In the present example the RF circuit has multiple antennas 50a, 50b, 50c through 50n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

Figure 3:
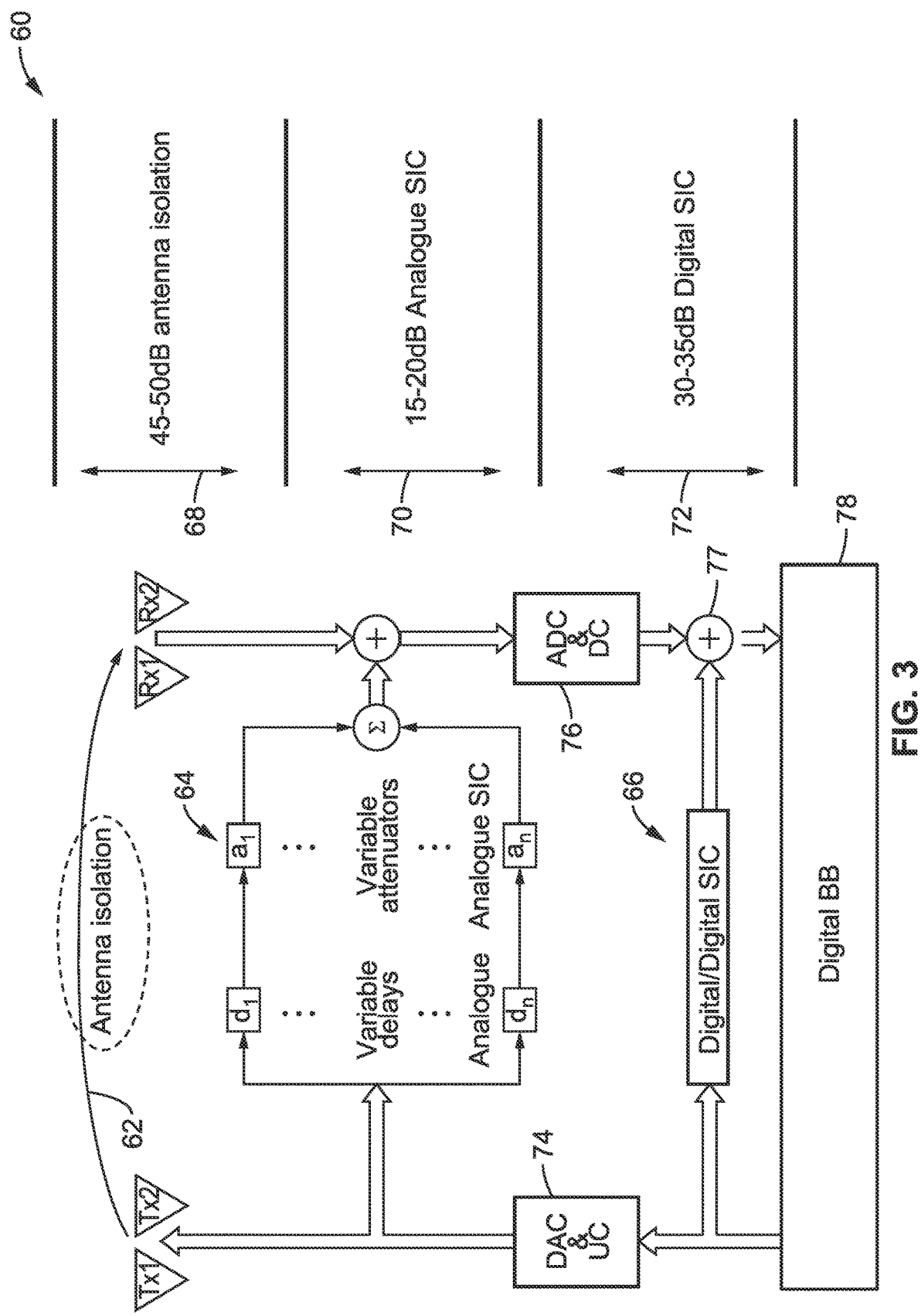
FIG. 3 is a block diagram for a STA, such as in an MLD, showing that between each pair of Tx chain and Rx chain, there are RF/analog Self-Interference-Cancellation (SIC) and baseband/digital SIC elements.

FIG. 3 illustrates an example embodiment 60 of Self-Interference Cancelation (SIC) hardware as utilized in a station, such as the STA seen in FIG. 2 and the MLD seen in FIG. 3. For each STA of the MLD, between each pair of Tx chain and Rx chain 62, there are RF/analog SIC and Baseband/Digital SIC 66 as described in IEEE802.11-18/ 0498r8 "Technical Report on Full Duplex for 802.11". These SICs are used to remove the transmitted signal (self-interference) from the received signal. Typically, Tx/Rx antenna isolation 68 provides about 45 to 50 dB reduction of self-interference. Analog SIC circuitry 70 can suppress about 15 to 20 dB of self-interference, while digital SIC 72 ideally can suppress around 30 to 35 dB of self-interference.

A digital baseband 78 is shown with DAC and UC 74 for the Tx, and ADC and DC 76 for the Rx. A signal from the transmit chain is shown used for digital/digital SIC 66 and summed 77 with input from the ADC and DC 76 of the Rx which enters the digital BB 78. Before the Rx chain can receive useful signals, a transmitted training signal sent from the Tx chain may be received in the baseband 78, after ADC and DC 76, to estimate a self-interference channel from Tx baseband to Rx baseband. This estimated channel can then be used to estimate the self-interference created at baseband for digital SIC.

2. Residual CFO/SFO Correction for Joint Transmission (JT)

2.1. Topology of a Multiple AP Network

Figure 4:
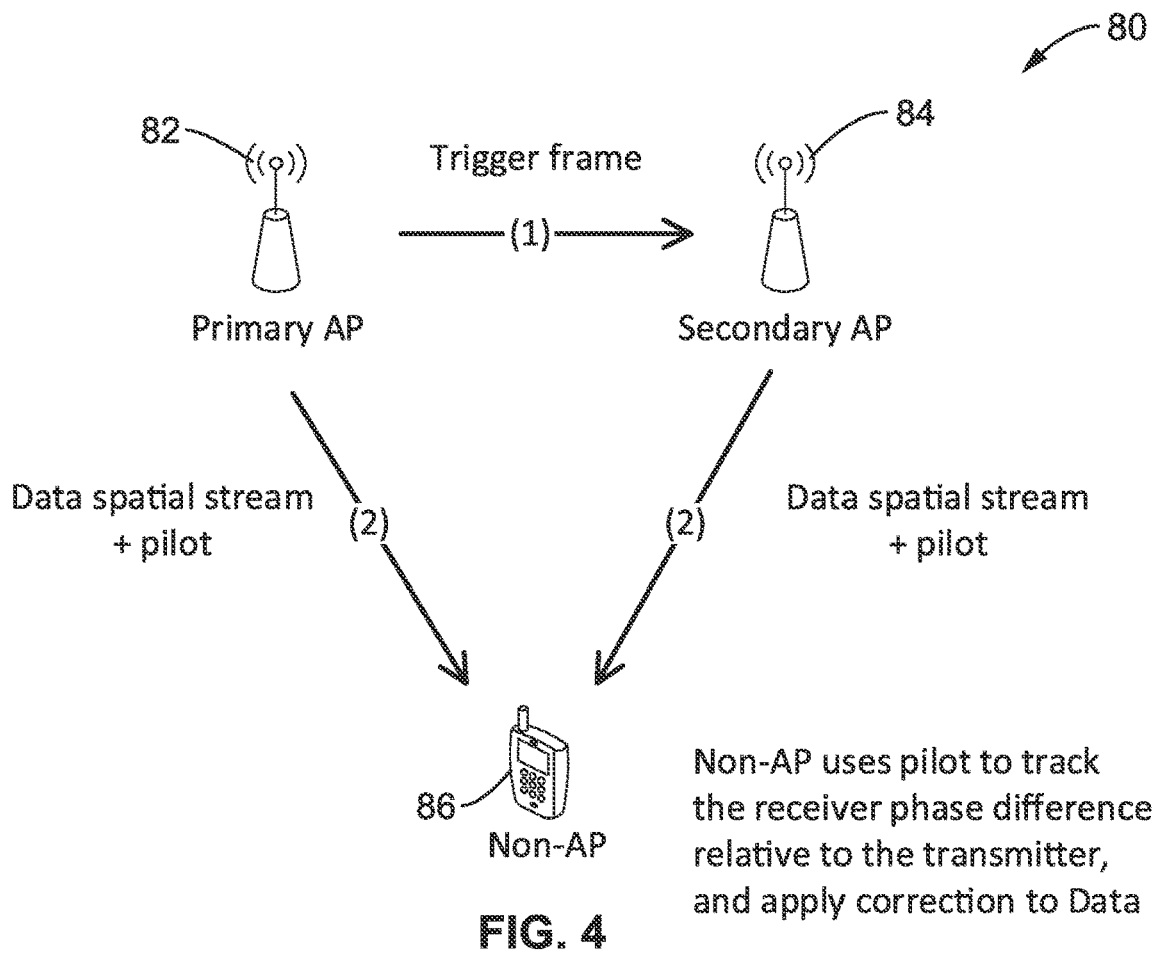
FIG. 4 is a topology diagram of a WLAN network multiple Access Points (APs) and at least one non-AP station (STA).

FIG. 4 illustrates an example topology 80 for demonstrating a residual Carrier Frequency Offset (CFO) and/or Sampling Frequency Offset (SFO) and CFO/SFO correction for Joint Transmission (JT). This and other topology figures herein are provided to aid discussion of the techniques involved and toward engendering an improved understanding of the proposed technology. It should be appreciated that the present disclosure is in no way limited to the topology of this example, as the protocol may be utilized on communications between WLAN STAs and MLDs of any topology.

In the figure, a multi-Access Point (multi-AP) joint transmission is performed to a non-AP station (STA). The joint transmission is from a primary AP 82 and one or more secondary APs 84 using the same time-frequency resource in Orthogonal Frequency Division Multiplexing (OFDM) to transmit at least one spatial stream to a non-AP STA 86. The data for the spatial stream was distributed to both primary and secondary APs before the following steps take place.

It should be noted that OFDM relies upon using multiple closely spaced orthogonal subcarrier signals with overlapping spectra to carry data in parallel; while demodulation is generally based on Fast Fourier Transforms (FFTs).

In step (1) a primary AP transmits a trigger frame which is received by the secondary APs participating in the joint transmission. This trigger frame establishes the center frequency and/or sampling rate of the joint transmission and synchronizing of the clocks between APs. The trigger frame may also contain instructions from the primary AP for precoding the data at the secondary AP for the spatial Data stream.

In step (2) the primary and secondary APs precode Data and send the spatial Data stream and pilots jointly to the non-AP STA.

The non-AP STA uses the pilot signals to track receiver phase difference relative to the transmitter and apply correction to received Data.

It will be appreciated that when demodulating an Orthogonal Frequency Division Multiplexing (OFDM) burst, the estimated carrier center frequency offset computed from the preamble allows an initial correction of the received OFDM signal. Since AP's clock frequency in the packet duration does not stay the same as estimated by the receiving non-AP during preamble, i.e., residual Carrier Frequency Offset, pilot tracking is used to correct these additional clock drift and for imperfections that change over the length of the packet. In each OFDM symbol, some of the subcarriers are typically dedicated to pilot signals in order to make the coherent detection robust against frequency offsets and phase noise. Pilot subcarriers transmit with a known data sequence. This information is used to determine the difference, or error, between an ideal signal and the actual received signal. The error data can then be used to correct both pilot and data subcarrier imperfections, toward a more accurate demodulation.

In the JT process, the synchronized clock between APs may start to drift due to residual Carrier Frequency Offset (CFO). In this JT scenario, since there is more than one transmitter; the clocks between these transmitters may also have phase differences due to the residual Carrier Frequency Offset (CFO).

2.2. Problem Statement for Topology of FIG. 4

It has been determined that residual CFO degrades JT performance. In JT, equalized pilots of a Spatial Stream (SS) contain mixed signals from multiple transmitters with different clock drifts (unlike UL MU-MIMO). Therefore, the pilots cannot be used by the non-AP STA to estimate a single drift per SS to perform correction. Degradation is caused by different clock drifts at different APs.

Currently proposed solutions to this issue require additional overhead in periodically sending midambles to re-estimate the channel at the receiver side. The disclosed approach does not incur this additional overhead for midambles.

2.3. Approach to the Problem Seen in FIG. 4

The AP stations participating in JT are Full Duplex (FD) capable. In at least one embodiment of the present disclosure certain pilot tones (primary pilots) are only allowed to be transmitted by the primary AP, or by an AP which can be heard by all other APs. The phases of the pilots can be measured at the same time by other APs during JT. Clock drift is corrected during JT at the transmitter side by non-master APs to match the clock of the master AP. The following provides a few examples.

Primary AP: (a) transmits primary pilot tones in Long Training Field (LTF) symbols; (b) transmits primary pilot tones in Data symbols; and (c) transmits non-primary pilot tones using both LTF and Data symbols.

Secondary AP: (a) receives primary pilot tones in LTF symbols; (b) receives primary pilot tones in Data symbols; (c) transmits non-primary pilot tones in LTF and Data symbols; (d) uses primary pilot tones in LTF and STF to estimate clock drift and use LTF to estimate channel (channel response), including the estimated channel for the pilot tone; (e) uses the above estimated clock drift to apply correction to subsequent OFDM symbols and use the estimated channel to equalize the received primary pilot in Data symbols; (f) uses the phase offset of primary pilot tones at different frequencies to estimate time difference relative to primary AP; or (g) uses the phase offset of primary pilot tones at different symbols to estimate frequency difference relative to the primary AP.

It should be appreciated that the disclosed approach incurs no overhead from the sending of midambles, as it has no need of sending midambles.

2.4. Pilot Tones Transmitted by Master AP Only

Figure 5:
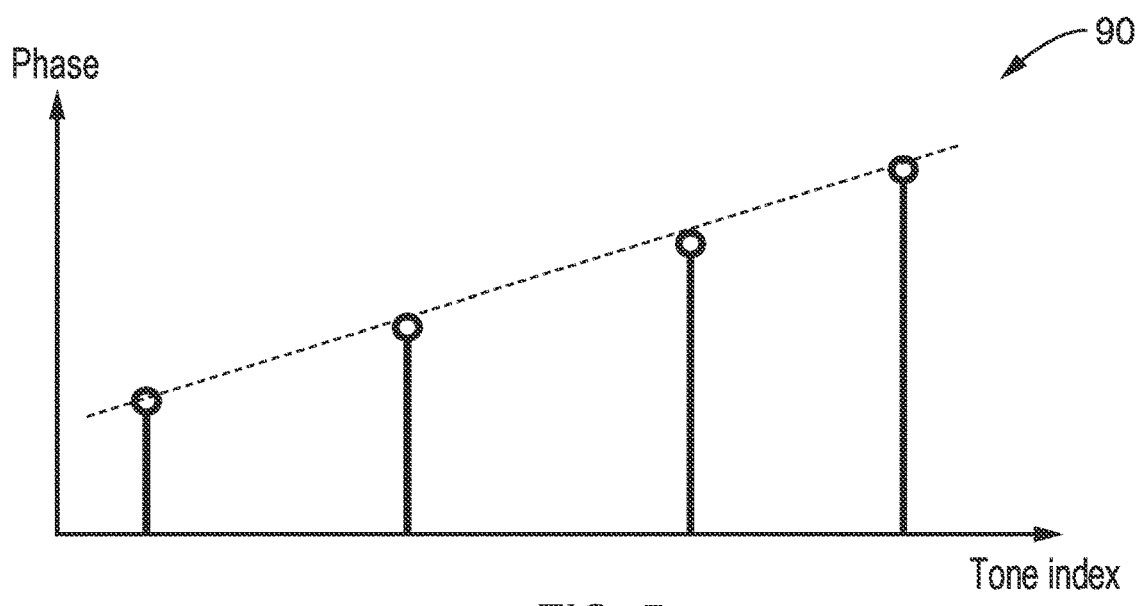
FIG. 5 is a plot of example pilot phase measurements according to at least one embodiment of the present disclosure.

FIG. 5 illustrates an example of the JT depicted in FIG. 4 and shows primary pilot phase measurements 90 by the slave (secondary) AP of the pilot tones which are only transmitted by the master (primary) AP. The linear phase shift between tones can be seen in the figure which indicates that the slave (secondary) AP's sampling instance is delayed/ahead in relation to the master (primary) AP's sampling instance. In response to this, the slave (secondary) AP makes correction in the following OFDM symbols of its own transmitted signal.

Because the secondary AP is a FD device, it can perform Joint transmission on other non-primary pilot tones of the OFDM symbol while listening to the same OFDM symbol after SIC. It then performs reception and equalization of the primary pilot tones with outputs to be used for the above measurement. The slope in the frequency domain indicates a lag/advance of a time domain sample when compared to the same time domain sample from the primary AP. The secondary AP then corrects the next OFDM symbols in the time domain based on the estimated time domain lag/advance, or corrects next OFDM symbols in the frequency domain based on the estimated linear phase offset.

3. MLO in a Single Band

Figure 6:
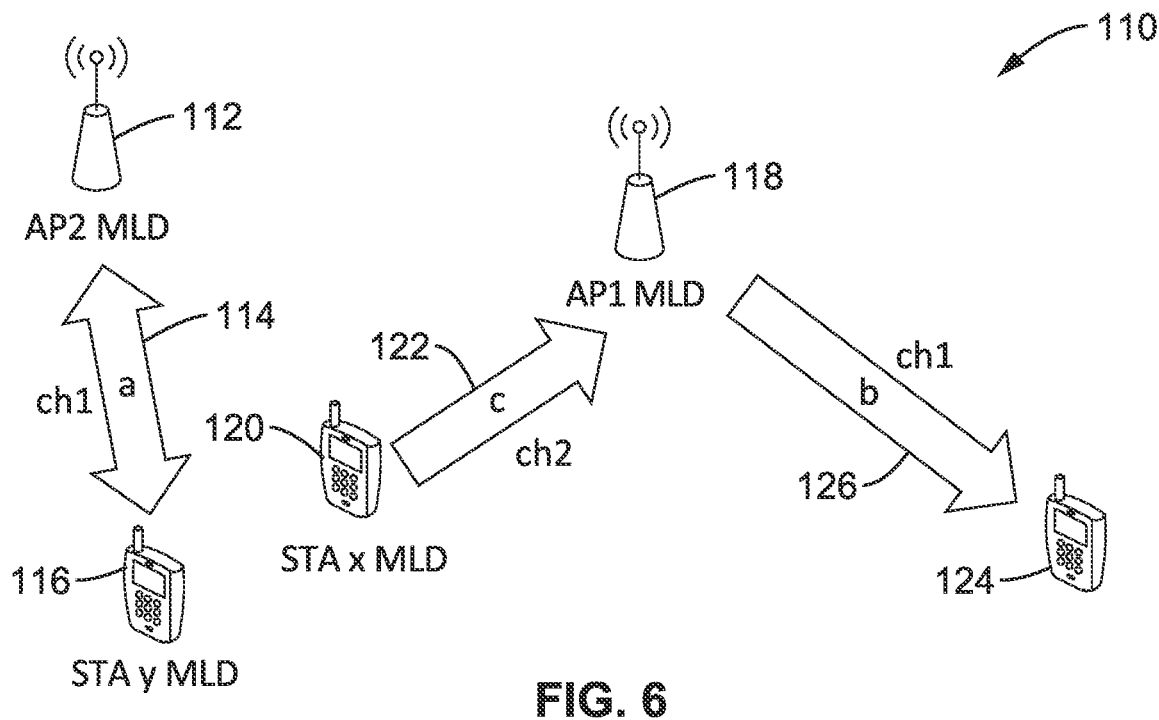
FIG. 6 is a network topology diagram for describing Multi-link operations in a single band according to at least one embodiment of the present disclosure.

FIG. 6 illustrates an example network topology 110 used in describing Multi-link operation in a single band. In the existing WLAN without FD, the STAx MLD's transmission on Ch2 is not possible, and the communication between STAy MLD and AP2 MLD on Ch1 cannot be bidirectional. In a WLAN according to the present disclosure with FD capability, AP2 MLD and STAy MLD may perform bidirectional communication, however, they may not be able to detect the preamble sent by STAx (or TXOP duration set by STAx MLD) on Ch2, and may transmit on top of STAx's transmission on Ch2 after communication on Ch1 for another communication.

The figure depicts AP2 MLD 112 with bidirectional (FD) communication over a first channel (Ch1) 114 with STAy MLD 116. Also is seen STAx MLD 120 transmitting 122 over a second channel (Ch2) with AP1 MLD 118, which is in turn is transmitting 126 over the first channel (Ch1) with another STA 124 which communicates with the AP1 MLD on ch1 but does not use ch2 as another link for transmitting or receiving.

In the figure AP1 MLD 118, AP2 MLD 112, STAx MLD 120, STAy MLD 116 are MLDs operating on two links, and the two links in this example are neighboring channels (channels adjacent to each other with some separation but within a frequency band), or as indicated herein as Ch1 and Ch2. The use of Full-Duplex (FD) opens up an opportunity for performing Multi-link operations (MLOs) in a single band.

Ideally within the same FD device, such as AP2 MLD, STAy MLD, or AP1 MLD, receptions on Ch2 from STAx MLD and transmissions on a Ch1, may require OFDM symbol alignment in the time domain. With alignment, at baseband the self-interference generated by the collocated transmitter on Ch1 received by the collocated receiver on Ch2 at a tone frequency is 0, because the self-interference is orthogonal to the Ch2 OFDM tones by using the same window for FFT/IFFT. This does not require the self-interference channel estimation for digital SIC. If the transmit symbol and receive symbol are not aligned, the transmitted signal on Ch1 will create a non-zero signal (self-interference) to each of the OFDM tones on Ch2, and this is problematic. i.e., without alignment, the receiver on Ch2 collocated with the transmitter on Ch1 needs to estimate Self-Interference channel response on Ch2 generated by the transmitted signal on Ch1 due to symbol misalignment, and this requires Ch2 to be idle/quiet when transmission starts on Ch1 (i.e., training signal should be received on Ch2 for self-interference channel estimation when the transmitter starts transmission on Ch1, to ensure the reception on Ch2 during the transmission on Ch1).

3.1. Problem Statement for Topology of FIG. 6

In an MLD, it is desirable to hear on link2 (Ch2) while transmitting on link1 (Ch1). Otherwise, there is a recovery period on link2 following the transmission on link1. In this recovery period, the MLD is not certain the NAV (network allocation vector) on link2 and must use a conservative energy detection threshold for CCA or not transmit on link2 at all. Even with FD capability at AP2/STAy/AP1 MLD, as described above, they may not be able to cancel out their self-interference from Ch1 to Ch2 while transmitting on Ch1 unless STA x's signal on Ch2 is symbol aligned in time with AP1/AP2/STAy's signal on Ch1. The problem arises when AP1 and AP2/STAy are all transmitting, STAx receives a collided signal and cannot detect symbol timings used on Ch1. Furthermore, the symbol timings from AP1 and AP2/STAy are different, and STAx cannot transmit a signal on Ch2 aligning to different symbol timings. The misalignment causes either AP1 or AP2/STAy not being able to detect the STAx's signal. If AP1 cannot detect STAx's signal on Ch2 while transmitting on Ch1, then STAx's packet is lost. If AP2/STAy cannot detect STAx's signal on Ch2 while transmitting on Ch1, they will be forced to enter a recovery period on Ch2 after their transmission on Ch1 (or risk a collision of future transmissions on Ch2 with undetected STAx signal).

A problem arises when a non-AP station, exemplified here as STAx MLD, has data to send to an AP (such as AP1 MLD or another receiver which is not AP1 MLD) when either AP1, AP2 or STAy MLD already have an ongoing transmission on Ch1, and there is an Overlapped Basic Service Set (OBSS) with AP2 MLD, and STAy MLD also has an ongoing communication exchange on Ch1.

The problem is that the MLD of STAx transmitting on Ch2 cannot simultaneously align OFDM symbols on Ch1 at the same time with the MLDs of AP1, AP2 and STAy. Without orthogonality of transmitted OFDM signals on Ch1 and received OFDM signals on Ch2, some of the MLDs (e.g., AP1, AP2, STAy) cannot receive a NAV on Ch2 from the MLD of STAx. Thus, without orthogonality, AP1, AP2 and STAy would be required to estimate a Ch2 Self-Interference (SI) channel response for cancelling signal generated from the transmission discontinuity on Ch1; again, this is undesirable because it requires Ch2 to be idle when transmission starts on Ch1.

Figure 7:
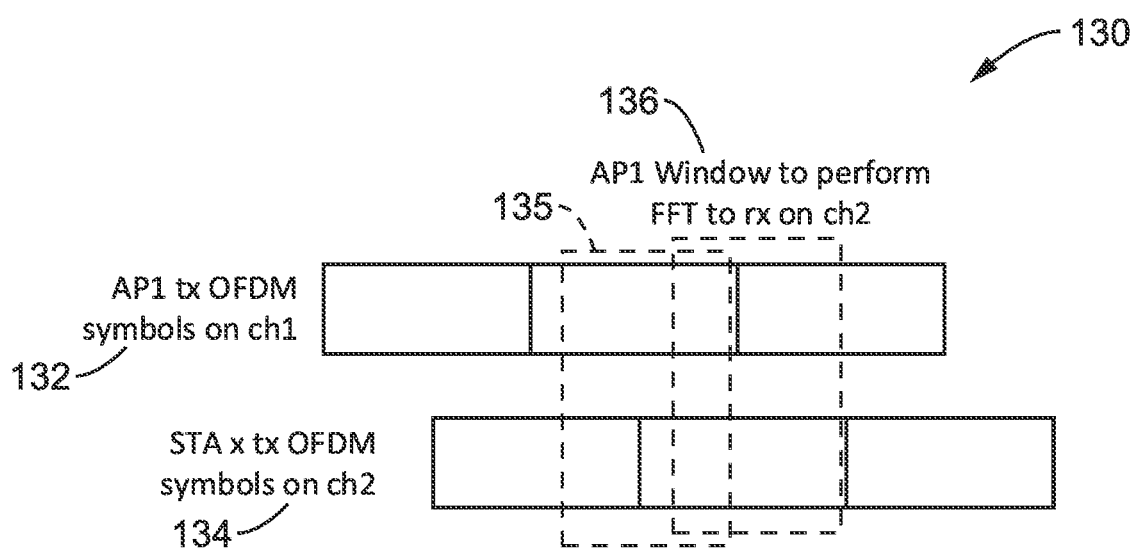
FIG. 7 is an OFDM window diagram of multiple link operations and a simple solution (naïve solution) which has a number of shortcomings.

FIG. 7 illustrates an example 130 of when AP1 detects Ch2 OFDM symbols while transmitting on Ch1 without prior self-interference channel estimation at baseband. The figure depicts AP1 Tx ODFM symbols on Ch1 132, and STAx Tx OFDM symbols on Ch2 134. By using window 135 for FFT, the interference from Tx Ch1 to Rx Ch2 is zero (on Ch2's OFDM tone positions), but there is a discontinuity of OFDM symbols on Ch2 in window 135 and cannot be used for IFFT. By using AP1 window 136, the OFDM symbol discontinuity occurs at Tx side, and this creates interference on Ch2's tone positions. The interference cannot be canceled unless AP1 knows (has sufficient information on) Ch2's self-interference channel response.

3.2. Approach to Problem Depicted in FIG. 7

To overcome the above additional problem, in the present disclosure the initial message for NAV signaling (init msg) on Ch2 is transmitted from STAx MLD with dual continuous OFDM symbol, to be received by those STAs (e.g., AP1, AP2, STAy MLDs) which are transmitting on Ch1.

The intended receiver (AP1 MLD) replies with a short reply message indicating the OFDM symbol timing on Ch1 of AP1 MLD. The dual continuous ODFM symbols aid the MLDs for AP1, AP2, and STAy to understand the initial message.

The AP1, AP2, STAy MLD is capable of receiving over Ch2 while in the middle of transmission on Ch2 for the init msg without STAx OFDM symbol timing specifically aligned to any of their OFDM symbol timings; which indicates the shortcoming has been overcome.

AP1/AP2/STAy MLD does not need to estimate Ch2 SI channel response from the transmission on Ch1 because it is 0 with alignment.

In FIG. 6, when STA MLDx needs to transmit communication 122 on Ch2, there are already on-going transmissions 114 and 126 (single/bidirectional) on Ch1. STA MLD x may base its transmissions on the NAV (NAV2) from Ch2 and its CCA status to perform Backoff (BO), and then to transmit 122 on Ch2. In this case the PPDU of STAx MLD on Ch2 would carry a new NAV2.

There are numerous issues with this approach. Communications 114 and 126 on Ch1 collide at STAx MLD; and STAx MLD does not have information on OFDM symbol timing for AP1 MLD; and so forth.

Even if STA x MLD is able to align its OFDM symbol on Ch2 with transmitted OFDM symbols from AP1 MLD on Ch1, these are not aligned with transmitted OFDM symbols from the AP2 MLD. Thus, AP2 MLD cannot receive NAV2 from STAx. Thus, the AP2 MLD has NAV blindness on Ch2 after transmission 114.

3.2.1. MLO in Single Band—Overcoming Issues of Section 3.1

Figure 8:
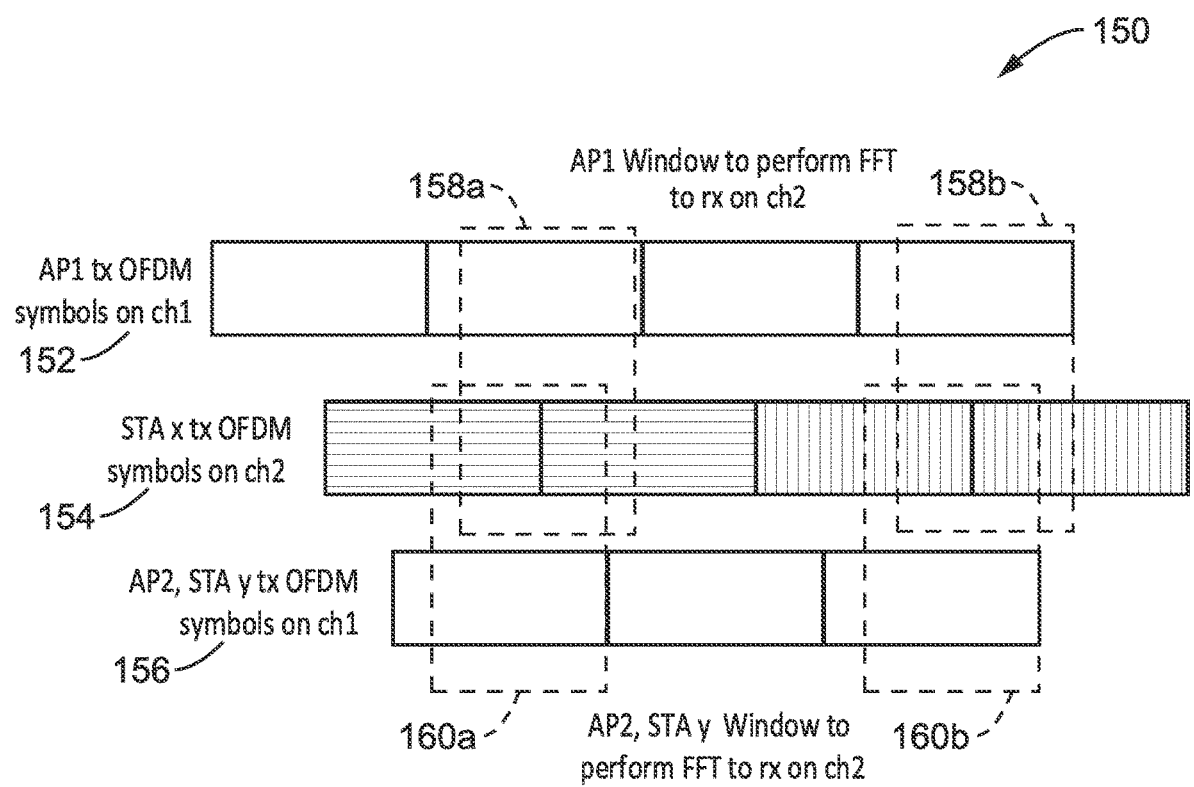
FIG. 8 is an OFDM window diagram of a solution to the naïve approach seen in FIG. 7, according to at least one embodiment of the present disclosure.
Figure 9:
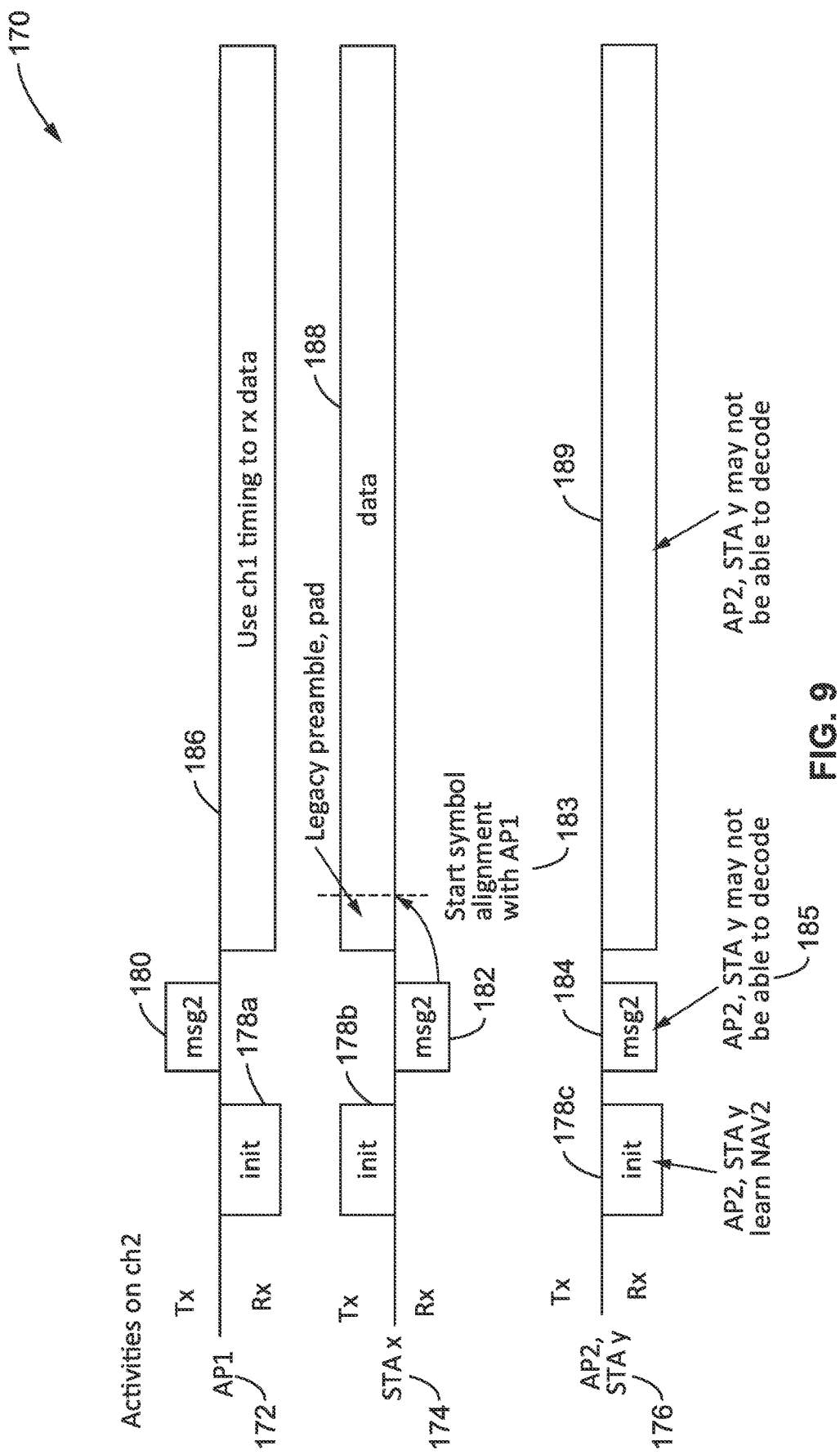
FIG. 9 is a communications diagram of a solution to the naïve problem as seen in FIG. 7, according to at least one embodiment of the present disclosure.

FIG. 8 and FIG. 9 illustrates solutions 150, 170 to the issues described in Section 3.1.

In FIG. 8 is shown AP1 OFDM symbol transmissions 152 on Ch1, STAx OFDM symbol transmissions 154 on Ch2, and AP2 and STAy OFDM symbol transmissions 156 on Ch1. There is also shown AP1 windows 158a, 158b to perform FFT for receiving on Ch2, and AP2, STAy windows 160a, 160b for performing FFT when receiving on Ch2. As shown in this figure, AP1/AP2/STAy all can use its own transmitting OFDM IFFT window as the receiving FFT window to receive the information carried in 154 without SI channel estimation on Ch2.

In FIG. 9 are seen communications between AP1 172, STAx 174, and AP2/STAy 176. STAx transmits an initial message 178b on Ch2, with the non-legacy portion of these signals carried in at least two OFDM symbols (for detection/timing, Channel Estimation (ChEst), NAV). The initialization is shown being received 178a, 178c by AP1 and AP2. STAy, respectively. Transmitters on Ch1 (AP1, AP2, STA y MLDs) receive STAx MLD NAV2. The AP2 and STAy transmitting on Ch1 can receive initialization message (init msg) and they learned the NAV set by STAx on Ch2 and does not need to enter a recovery period for Ch2 after transmitting on Ch1.

It should be noted that between the two symbols there is no discontinuity of signals. Once an initial pattern is detected, AP1, AP2, STAy MLDs can skip symbol (e.g., the symbol between 160a and 160b in FIG. 8 for AP2) and receive subsequent symbols (e.g., symbol containing window 160b in FIG. 8).

AP1 MLD sends a reply signal, referred to herein simply as "msg2" 180 on Ch2 to signal its OFDM symbol timing on Ch1, which is received 182 by STAx a. Msg2 facilitates STAx to acquire symbol timing of AP1 on Ch1 in case AP1's signal on Ch1 collides with AP2/STAy's signal on Ch1 from STAx's perspective and cannot determine AP1's symbol timing.

STAx MLD sends a data PPDU 188 on Ch2 following the symbol timing. A PPDU is shown with a legacy preamble or pad, with msg2 indicating the start symbol alignment 183 required with AP1.

Transmission of msg2 180 by AP1 MLD can be utilized by AP1 in estimating self-interference on Ch2. AP1 is shown using Ch1 OFDM symbol timing in receiving data 186. STAx may use extended symbols as described in FIG. 8 for data transmission 188 if data duration is short, or efficiency is not a concern. In this case, the initial msg and msg2 are not needed before sending data.

AP2, STAy is shown unable 185 to decode msg2, or data 188 if msg2 180 or data 188 is not transmitted using the extended symbol structure in FIG. 8. Information carried in these packets may not be useful for AP1 and STAy as they are not the intended receiver. AP2/STAy only needs the control information in the initialization message (init msg) to set NAV on Ch2. It should be noted that msg2 and/or data 188 are not useful information to AP2 and STAy. The Init msg is useful information to AP2 and STAy for setting NAV on Ch2. Also, if using extended symbols, the data length doubles and is not efficient.

4. Non-AP Triggered ACK from Multiple APs

Figure 10:
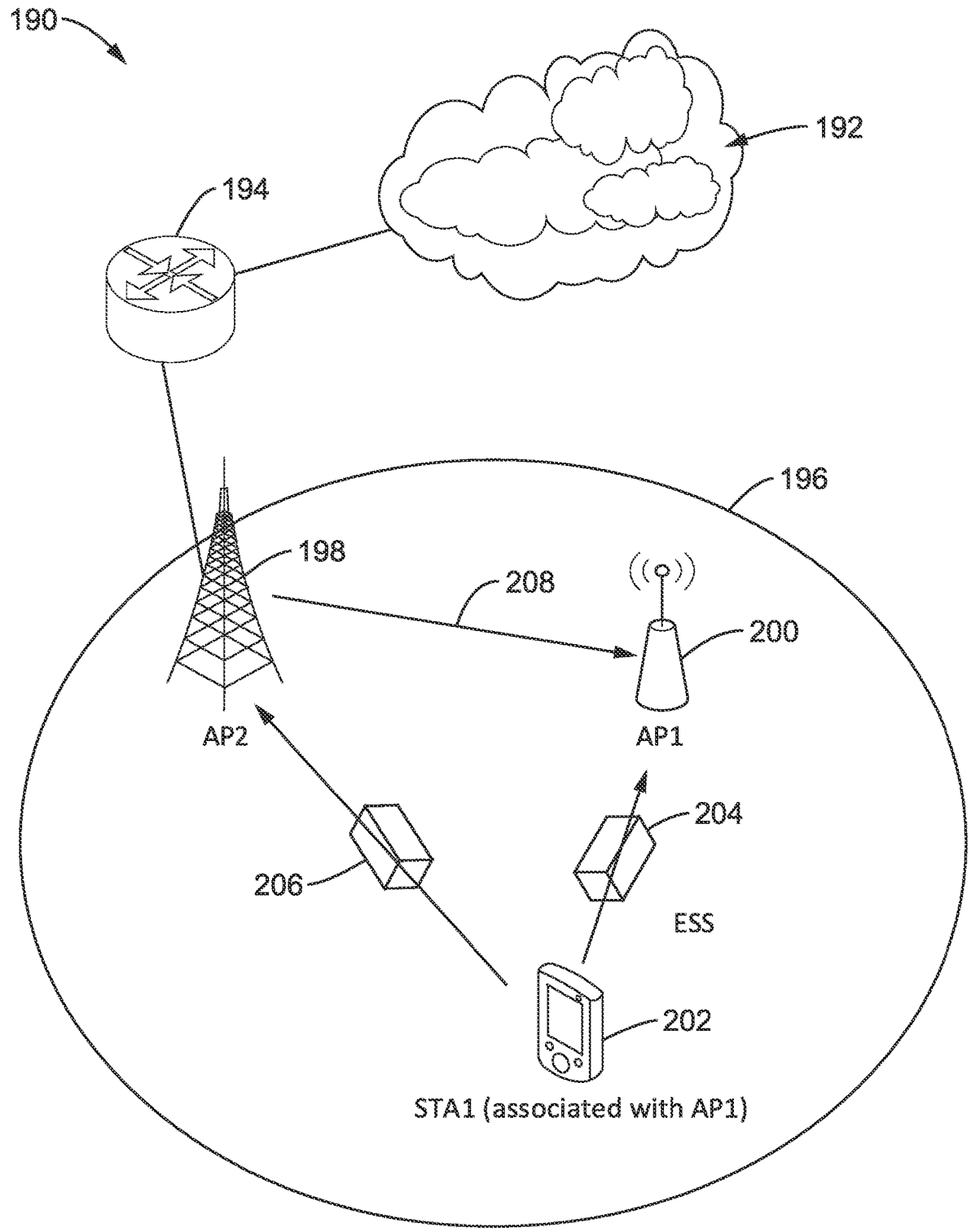
FIG. 10 is a network topology for describing a non-AP triggered Ack from multiple APs used according to at least one embodiment of the present disclosure.

FIG. 10 illustrates an example topology 190 for use in describing non-AP triggered Ack from multiple APs within BSS 196. STA1 202 is associated with AP1 200, and is also in the range of AP2 198. By way of example and not limitation, the figure depicts AP2 connected to a gateway 194 and Internet 192.

Figure 11:
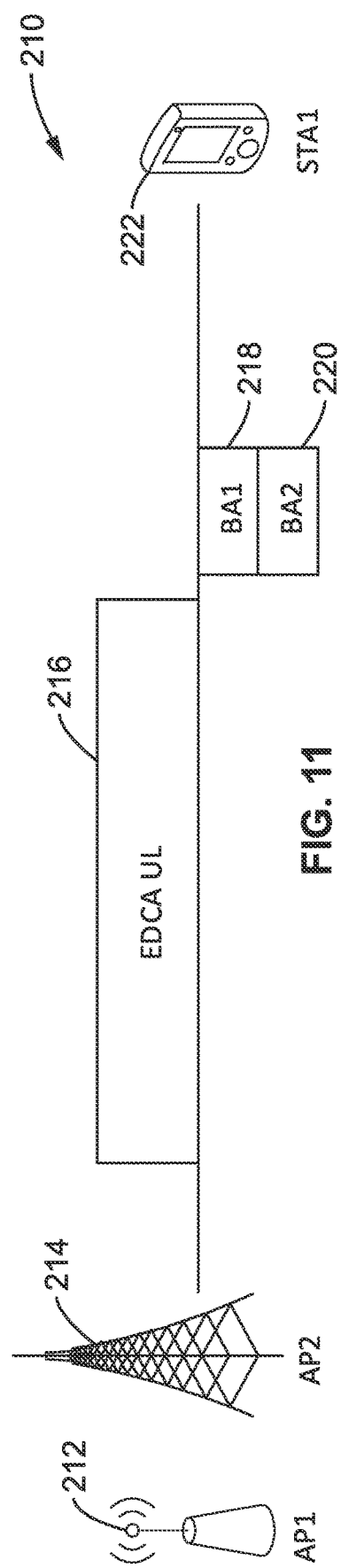
FIG. 11 is a communications diagram of a non-AP triggered Ack from multiple APs according to at least one embodiment of the present disclosure.

FIG. 11 illustrates an example communication 210 between STA1 222 and AP1 212, AP2 214 in performing a non-AP triggered Ack from multiple APs. The figure shows an EDCA UL 216, with BA1 218, BA2 220. PPDUs 204 and 206 are the same PPDUs transmitted by STA1 202 that are possibly received by AP1 200 and AP2 198. The PPDU itself serves as an implicit trigger for the Ack to be sent from AP1 200 and AP2 198. It will be noted that 208 is a backhaul link between AP1 and AP2.

AP1 advertises (not shown) that if an associated STA detects a neighbor AP2's beacon, it may solicit an acknowledgement (Ack or block Ack (BA)) for UL PPDU from AP2 in addition to AP1. The advertisement implicitly implies there is a backhaul link 208 between AP1 and AP2 and they are cooperating.

When transmitting an UL PPDU to AP1, STA1 may also solicit Ack/BA from AP2. STA1 assigns Resource Units (RUs) for AP1 and AP2 to perform ack/BA, in the UL PPDU. The RUs for AP1 and AP2 may be preconfigured without STA1's signaling.

In FIG. 10, transmissions 204, 206 are depicted to AP1 and AP2, respectively. FIG. 11 depicts this transmission as EDCA UL 216, with BA1 218, BA2 220 received from AP1 and AP2, respectively.

It should be noted that the Ack/BA from AP1 and AP2 may be within an OFDMA PPDU received by STA1. It should also be noted that AP2 is FD capable, and that when transmitting its BA2 to STA1, it also receives BA1 transmitted by AP1.

If AP2 successfully decodes BA1, it may: (a) send the MPDUs that is decoded by AP2, but not decoded by AP1, to AP1 via the AP1-AP2 link, or (b) send the MPDUs that are decoded by AP2, but not decoded by AP1, to gateway 194 or Distribution System (DS). AP2 may communicate to AP1 the TID, SN and/or STA ID of the corrected received MPDUs through the AP1-AP2 link.

If AP2 does not successfully decode BA1, it may: (a) send all successfully decoded MPDUs to AP1 through the AP1-AP2 link, or; (b) send all successfully decoded MPDUs to the gateway 194 or Distribution System (DS). AP2 may communicate to AP1 the Traffic priority Identifier (TID), Sequence Number (SN), and/or STA Identification (ID) of the MPDUs through the AP1 and AP2 link; (c) AP1 can be queried to determine MPDUs that have been decoded by AP2; but not yet decoded by AP1, then follows the procedure above for the case when AP2 successfully decodes BA1.

STA1 may discard the MPDUs/MSDUs acknowledged by either AP1 or AP2 from its retransmission buffer.

5. Flow of Embodied Methods

5.1. Residual CFO/SFO Correction for Joint Transmission

Figure 12:
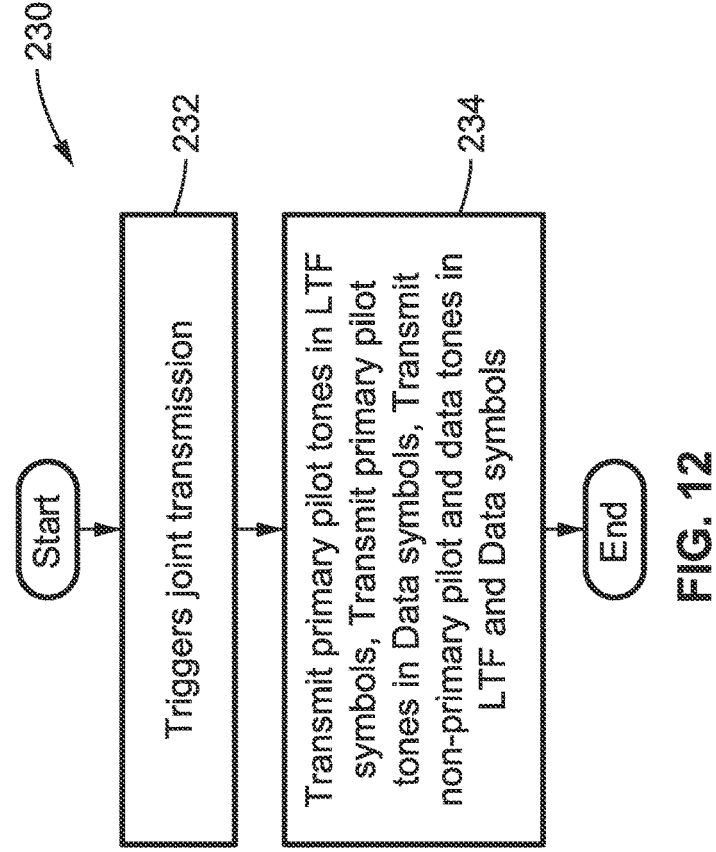
FIG. 12 is a flow diagram of residual CFO/SFO correction for joint transmission with the primary AP according to at least one embodiment of the present disclosure.
Figure 13:
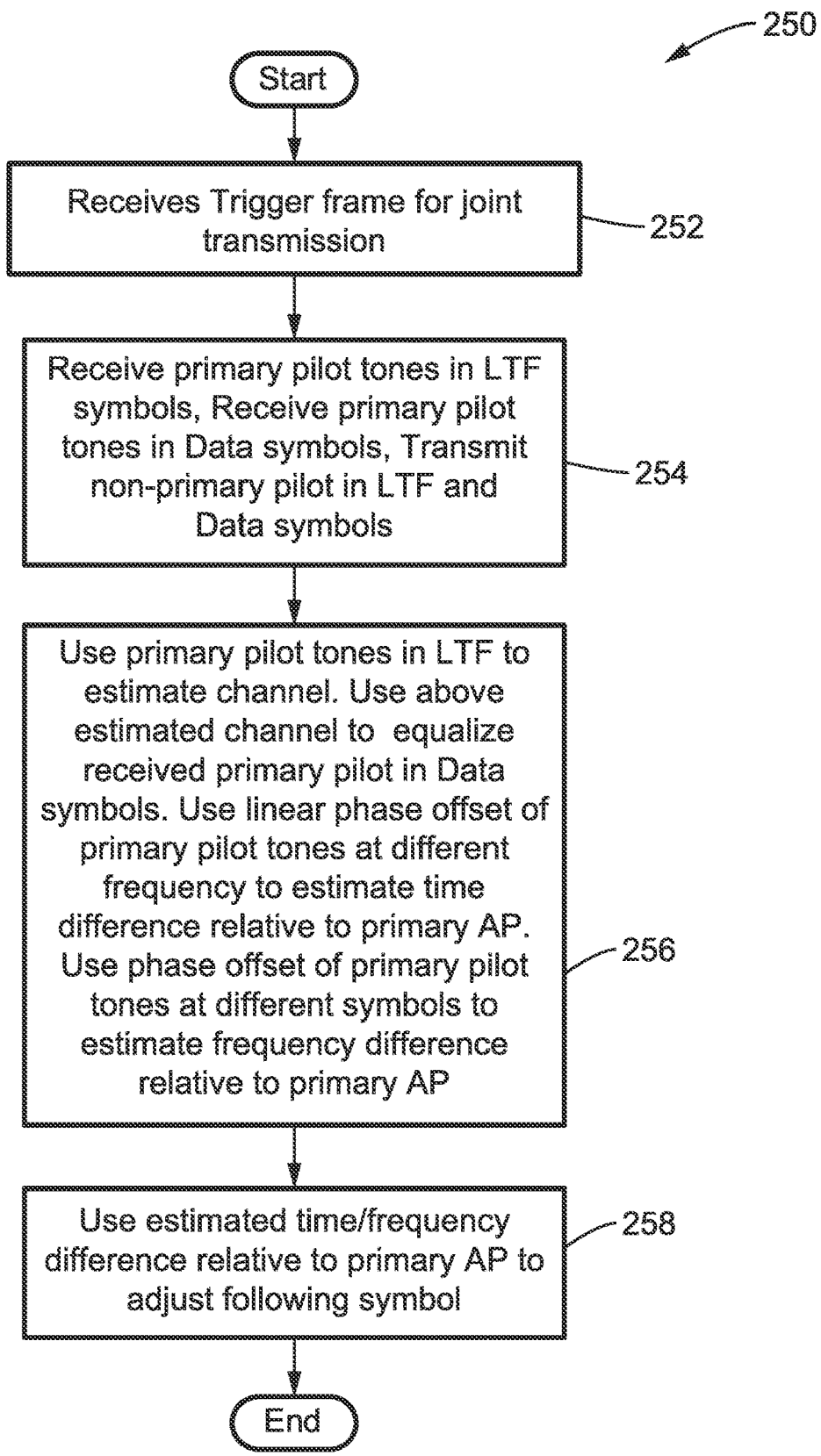
FIG. 13 is a flow diagram of residual CFO/SFO correction for joint transmission with the secondary AP according to at least one embodiment of the present disclosure.

FIG. 12 and FIG. 13 illustrate procedure embodiments 230, 250, for residual CFO/SFO correction for joint transmission as performed by the primary AP 230, and secondary AP 250, respectively.

The Primary AP is considered to be the AP which transmits primary pilots that are not transmitted by other APs. The primary/non-primary pilots were previously described.

In FIG. 12 the primary AP transmits the trigger frame that initiates joint transmission 232, after which it transmits 234 primary pilot tones in Long Training Field (LFT) symbols and Data symbols, and transmits non-primary pilot and Data tones in LTF and Data symbols.

In FIG. 13 The secondary AP receives a trigger frame 252 for joint transmission. It receives 254 primary pilot tones in LTF symbols, receives primary pilot tones in Data symbols, and Transmits non-primary pilot in LTF and Data symbols.

At step 256, the primary pilot ones in LTF are used to estimate channel characteristics. The estimated channel is used to equalize received primary pilot symbols in the Data symbols. Linear phase offset of the primary pilot tones at different frequencies are used to estimate the time difference relative to the primary AP. Phase offset of the primary pilot tones at different symbols are used to estimate frequency difference relative to the primary AP.

Then in step 258, the estimated time/frequency difference relative to the primary AP is used to adjust the following symbols.

FIG. 14 through FIG. 18 illustrate example embodiments 270, 290, 330 of Multi-link operation in a single band, for a non-AP STA (STAx), for the primary AP (AP1), and for secondary APs (AP2 MLD, STAy MLD), respectively.

Figure 14:
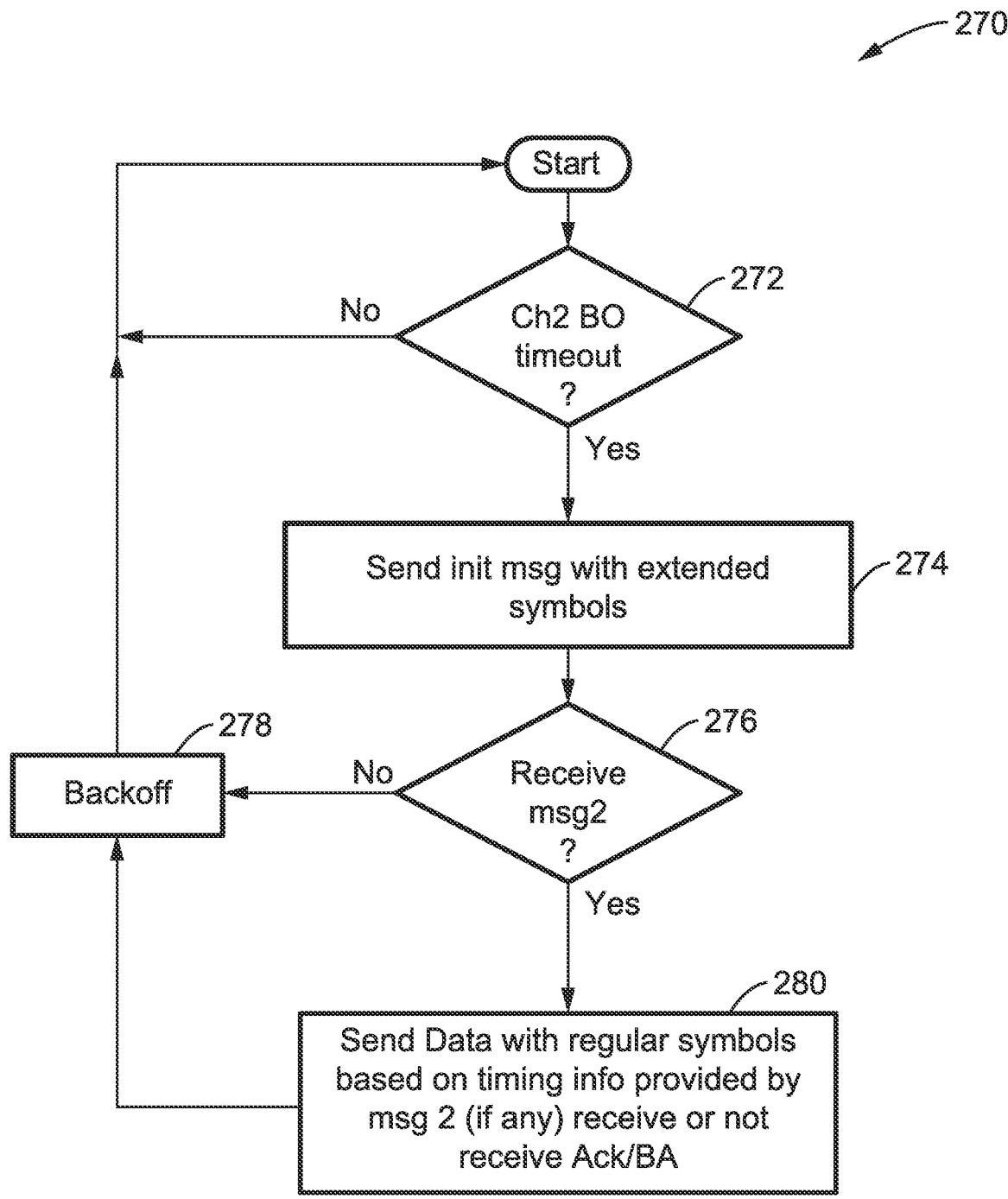
FIG. 14 is a flow diagram of a multi-link operation in a single band for a non-AP STA (STAx) according to at least one embodiment of the present disclosure.

In FIG. 14 the non-AP STA checks 272 to determine if Ch2 backoff has timed out. If it has not, then execution returns to this check. Otherwise, at block 274 the STA sends an initial message with extended symbols to the associated AP.

A check 276 determines if a response/reply (msg2) has been received. If it has not been received, then another backoff 278 is performed and execution restarts at block 272.

Otherwise, if the reply msg2 was received, then at block 280 data is sent with regular symbols based on timing information provided in msg2, if this additional information is carried in the msg. And it may receive or not receive an Ack or BA.

Figure 15:
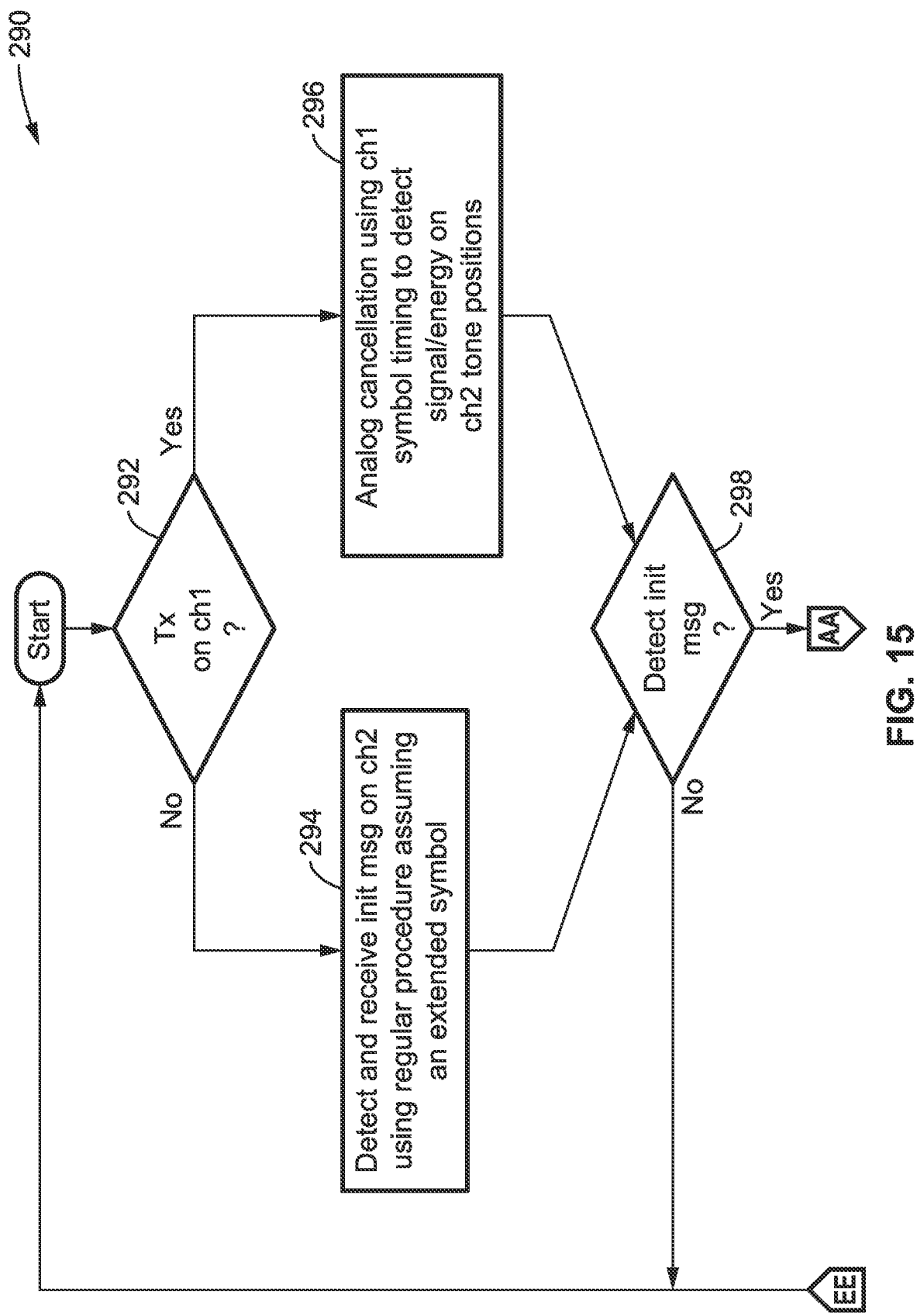
FIG. 15 through FIG. 17 is a flow diagram of a multi-link operation in a single band for the primary AP (AP1) according to at least one embodiment of the present disclosure.
Figure 16:
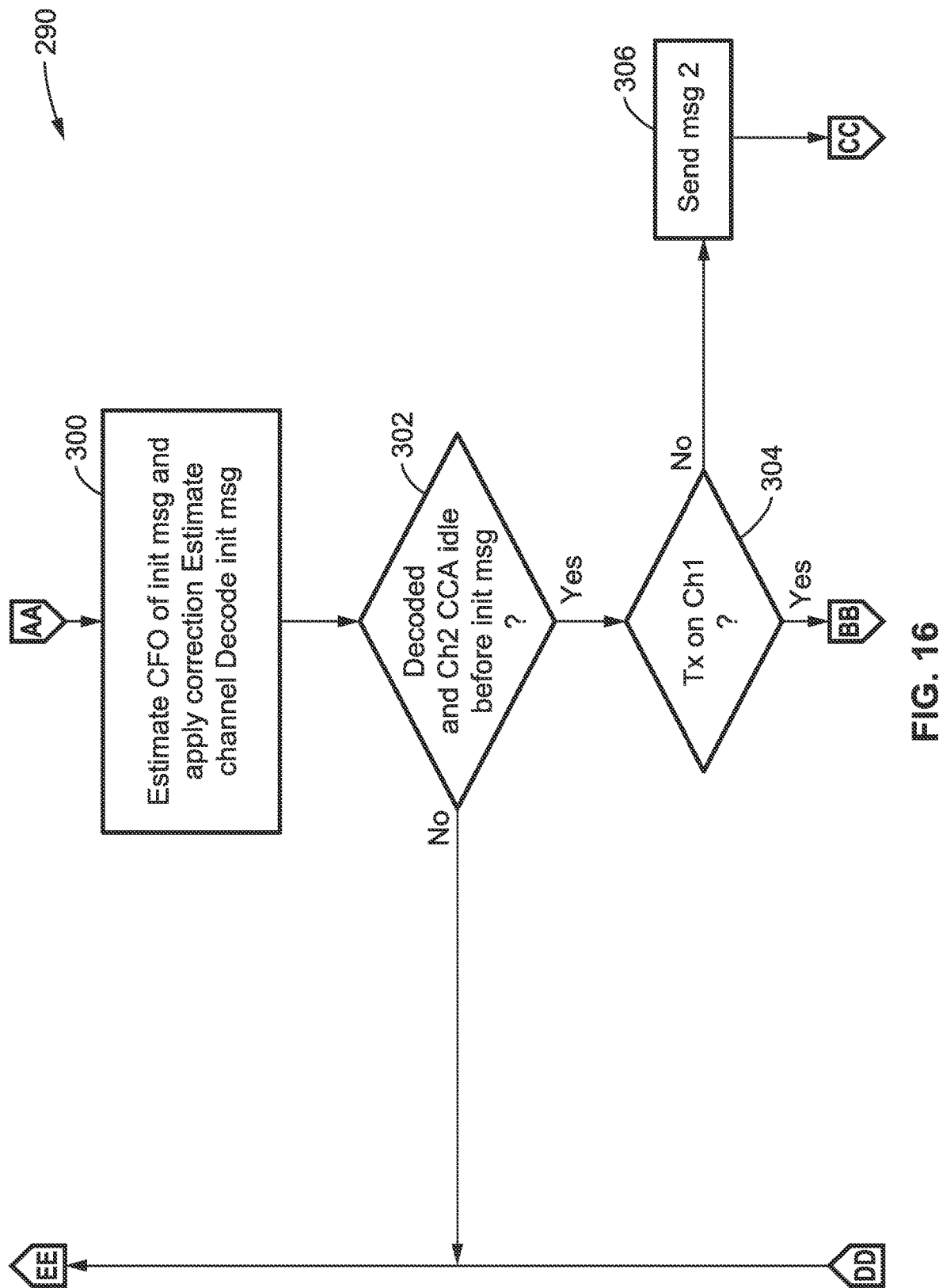
Figure 17:
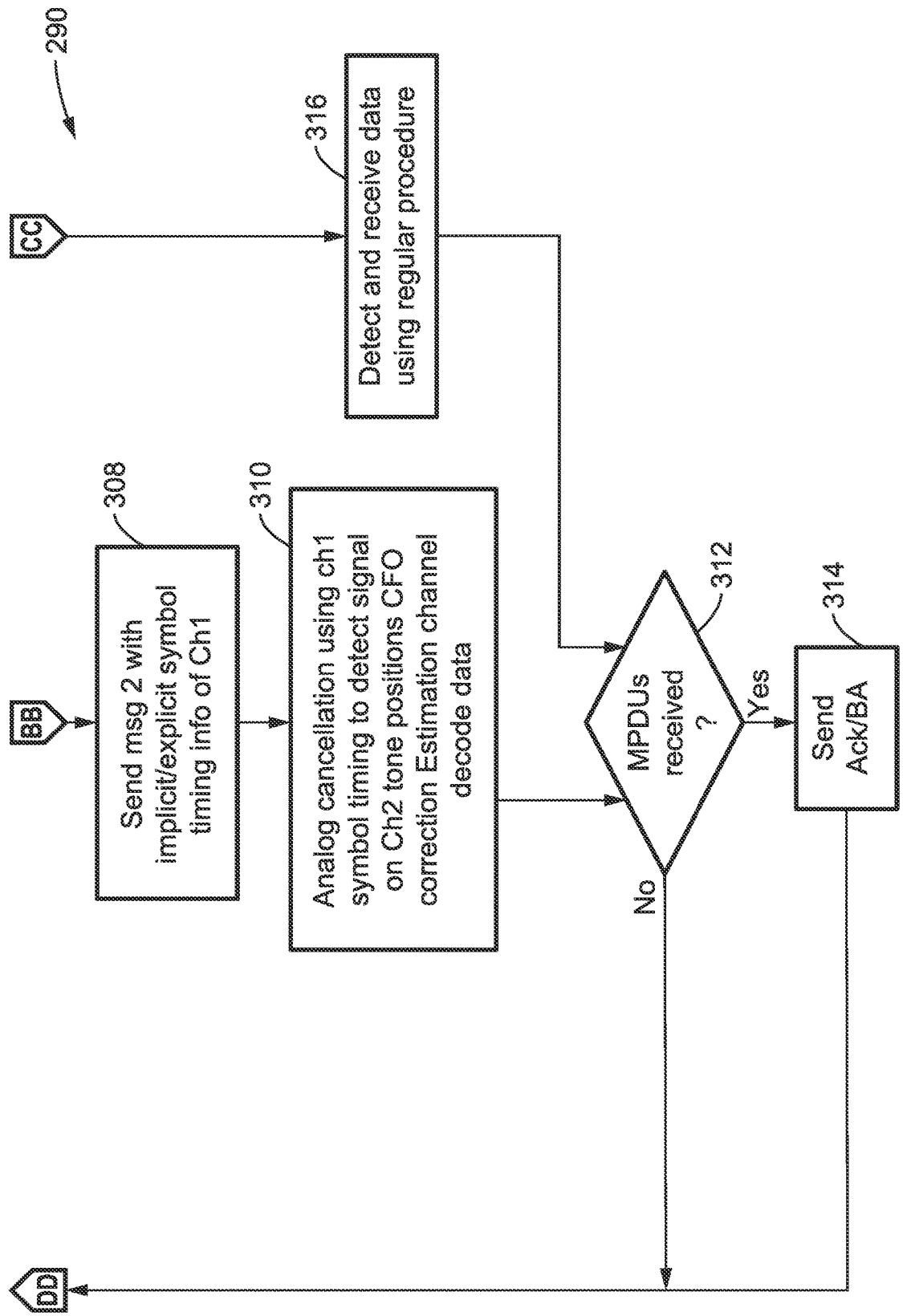

In FIG. 15 through FIG. 17 multi-link operation in a single band is seen for the primary AP (AP1). A check at block 292 determines if transmission is on the primary channel (Ch1). If that condition is not met, then at block 294 the AP (AP1) detects and receives the init msg on Ch2 using a regular (conventional) procedure which assumes an extended symbol; after which execution reaches block 298.

Otherwise, since transmissions are on Ch1, execution reaches block 296 which provides for analog Self-Interference Cancelation (Analog-SIC) and uses the primary channel (Ch1) symbol timing to detect signal and/or energy on secondary channel (Ch2) tone positions.

Execution then also reaches decision 298, which determines if an initial message has been received. If it has not been received, then execution returns to the start of the procedure.

Otherwise, since the initial message has been detected, execution reaches block 300 in FIG. 16 which performs FFT for the signals and receives training signals in the initial message time domain samples to estimate CFO of the initial message. Applies corrective phase shifts to the time domain samples and estimates the frequency domain channel using the training signals in the initial message. Uses the estimated channel to equalize/decode data portion of the initial message.

At check 302 it is determined if both conditions of: (a) the data portion of initial message was decoded, and (b) the secondary channel (Ch2) is idle (e.g., from a CCA idle assessment), prior to the initial message. If these conditions are not met, then execution returns to the top of the process 292.

Otherwise, at check 304 it is determined if the transmission is on the primary channel (Ch1). If it is not on the primary channel (Ch1), then at block 306 a reply msg is sent (e.g., msg2). Because the receiver is not transmitting on Ch1, so msg2 may not indicate Ch1 Tx OFDM symbol timing with execution then moving to block 316 in FIG. 17, which detects and receives data using the regular procedure without interference cancellation, then moves to block 312 of FIG. 17. Otherwise, since transmission is on Ch1, execution moves to block 308 in FIG. 17.

In block 308 a reply message (e.g., msg2) is sent with symbol timing information for Ch1. The OFDM symbol timing may be used for msg2 transmission or explicitly indicated in the msg2. Then in block 310 analog SIC cancelation is performed and uses Ch1 symbol timing to detect signals and estimate CFO of the data packet. Corrective phase shifts are applied to the time domain samples and it estimates the frequency domain channel using the training signals in the data packet. The estimated channel is used to equalize/decode data portions of the data packet on Ch2.

At block 312 a check is made if MPDUs have been received. If they have not been received, then execution is restarted at block 292. Otherwise, with the MPDU(s) having been received, an Ack or Block Acknowledge (BA) is sent 314, before the process starts again.

Figure 18:
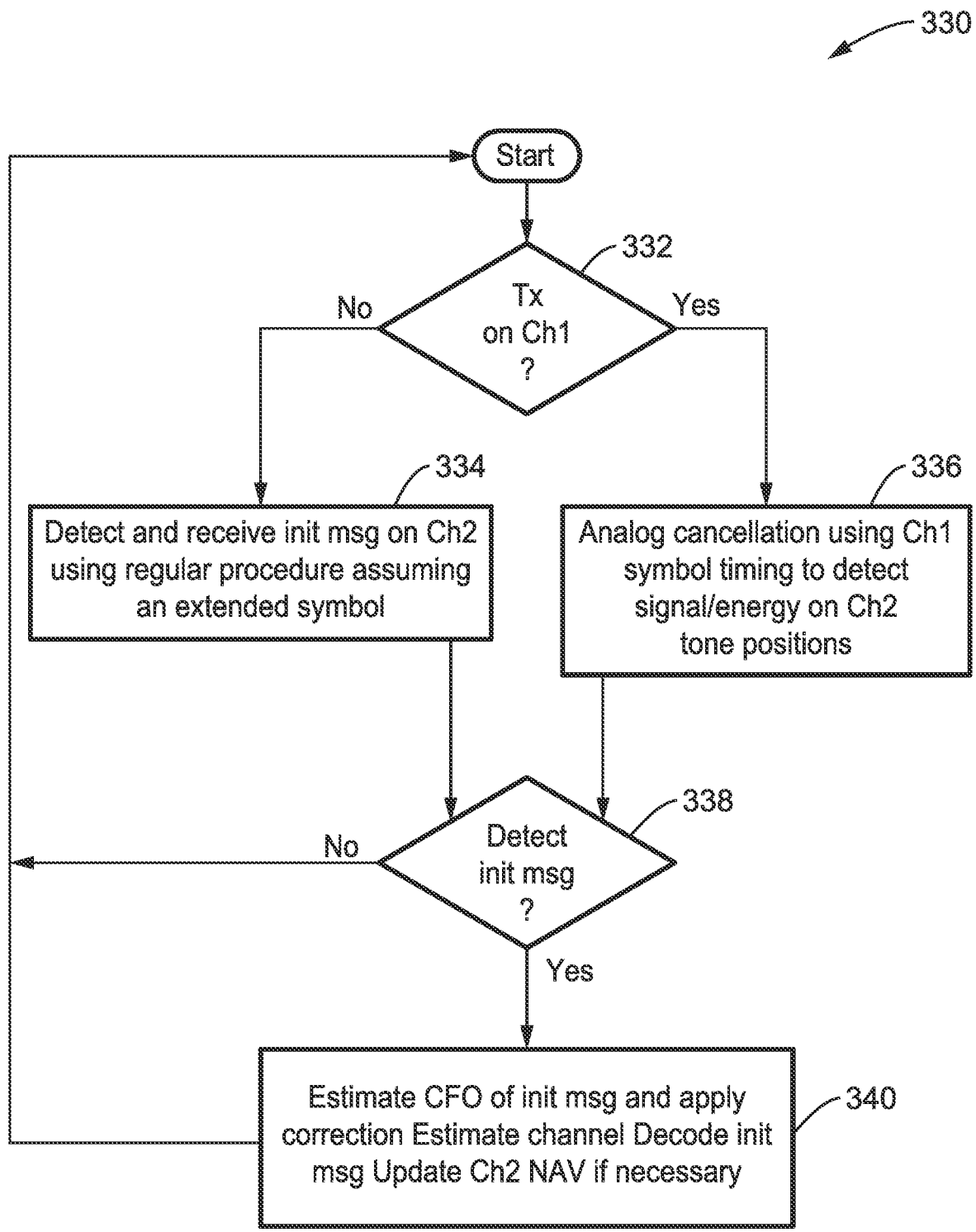
FIG. 18 is a flow diagram of a multi-link operation in a single band, for other MLDs according to at least one embodiment of the present disclosure.

FIG. 18 illustrates an example embodiment 330 for multi-link operation in a single band seen for the other MLDs. A check at block 332 determines if transmission is on the primary channel (Ch1). If the condition is not met, then at block 334 the MLD detects and receives the initial message on Ch2, using the regular (conventional) procedure assuming an extended symbol, and execution moves to block 338.

Otherwise, at block 336 analog SIC cancelation is performed using Ch1 symbol timing to detect signal/energy on Ch2 tone position, before reaching block 338.

Block 338 determines if an initial message has been received. If the initial message has not been received, then execution returns to the start at block 332. Otherwise, at block 340, estimation of CFO from the initial message is performed and corrections applied. The channel is estimated and equalizes/decodes the init msg to receive channel NAV, with Ch2 NAV updated as necessary.

Figure 19:
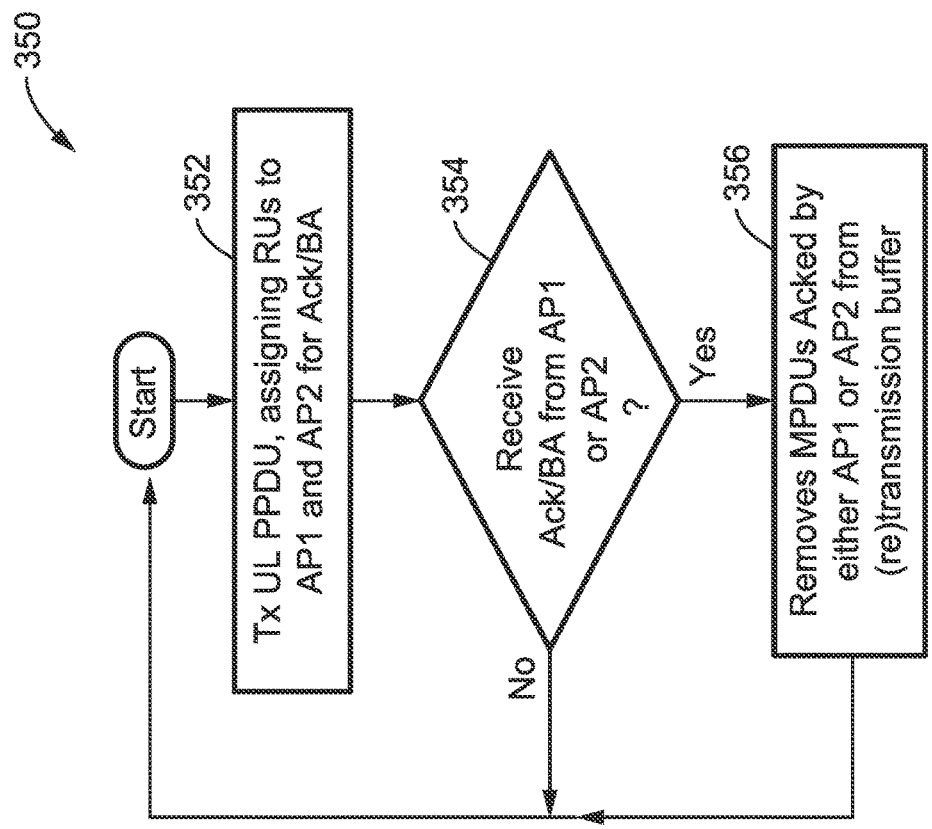
FIG. 19 is a flow diagram of a non-AP triggered Ack for a non-AP station, according to at least one embodiment of the present disclosure.

FIG. 19 illustrates an example embodiment 350 of a non-AP triggered Ack from multiple APs, showing general method steps for a non-AP station.

In block 352 a Data transmission (UL PPDU) is performed, and Resource Units (RUs) are assigned to AP1 and AP2 for Ack/BA.

A check 354 determines if an Ack/BA has been received from the primary or secondary APs. If the Ack/BA has not been received, then execution returns to block 352. Otherwise, at block 356 the removal of the MPDUs from the (re)transmission buffer is acknowledged by either the primary or secondary AP, and execution returns to the start of the process.

Figure 20:
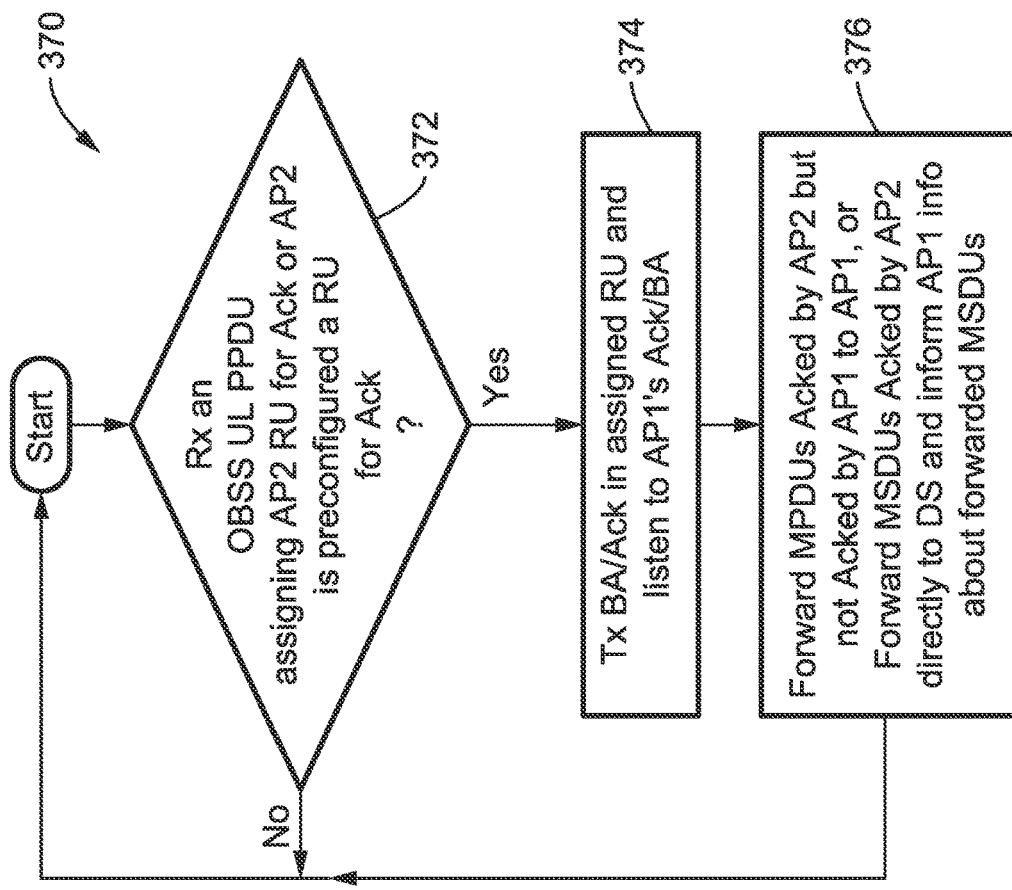
FIG. 20 is a flow diagram of a non-AP triggered Ack for a secondary AP, according to at least one embodiment of the present disclosure.

FIG. 20 illustrates an example embodiment 370 of a non-AP triggered Ack from multiple APs, showing general method steps for a secondary AP (AP2) station.

In block 372 a check determines if an OBSS UL PPDU has been received which assigns AP2 RU for Ack or in which the secondary AP (AP2) has preconfigured a resource unit(s) (RU) for Ack. If the condition is not met, then the check is repeated.

Otherwise, at block 374 an Ack/BA is transmitted in the assigned RU and the secondary awaits an Ack/BA from the primary AP. Then at block 376 MPDUs are forwarded which were Acked by the secondary AP, but not the primary AP; or MPDUs, which were Acked by the secondary AP, are forwarded directly to the Distribution System (DS) and the primary AP is informed about the forwarded MSDUs.

Figure 21:
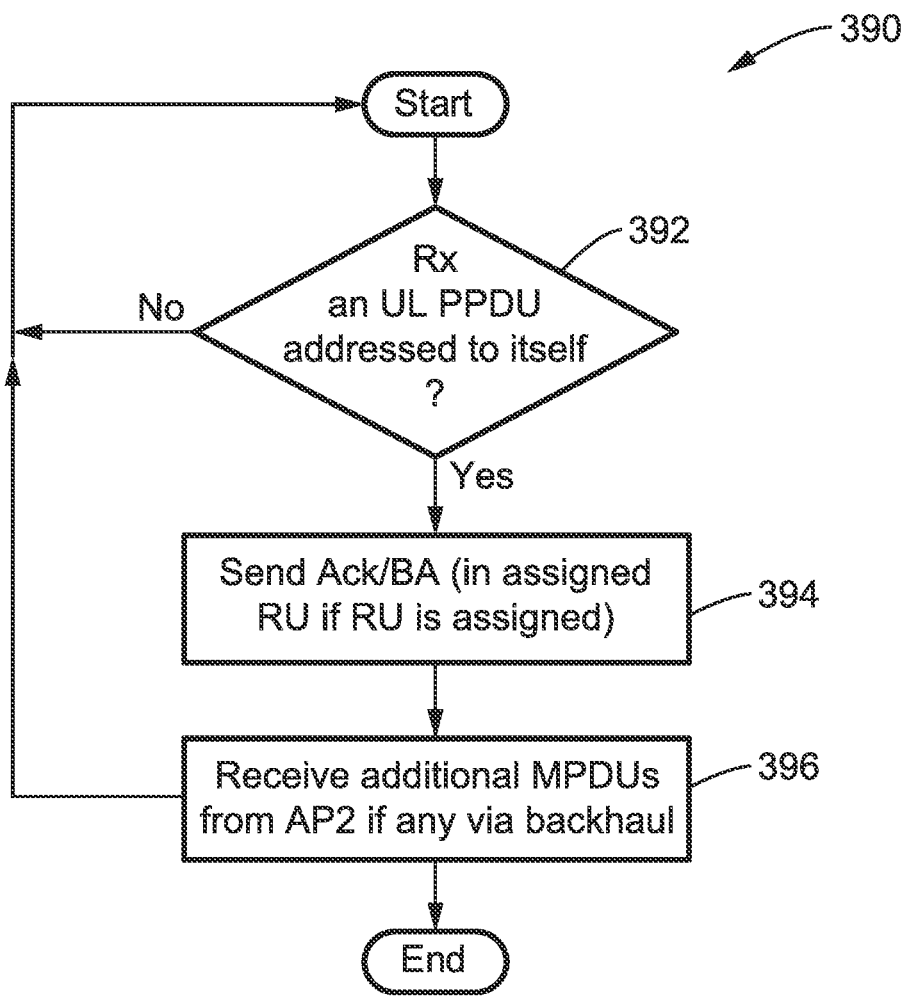
FIG. 21 is a flow diagram of a non-AP triggered Ack for a primary AP, according to at least one embodiment of the present disclosure.

FIG. 21 illustrates an example embodiment 390 of a non-AP triggered Ack from multiple APs, showing general method steps for a primary AP (AP1) station.

In block 392 a check determines if a UL PPDU has been received which is addressed to self (this primary AP station). If the condition is not met, then the check is repeated.

Otherwise, at block 394 the primary AP sends an Ack/BA, in an assigned RU, if it has been assigned. Then in block 396 additional MPDUs are received from the secondary AP if there is a backhaul link, after which the process continues at the start.

6. General Summary of Embodiments

The following attempts to express a summary in specific items;

however, it should not be construed that every inventive aspect is also represented in the following list of items.

1. "In x" in this Description section refers to the sentence begins with the number "x".

2. For a multi-AP system, there is a primary AP and one or more secondary APs. Each AP has its own individual clock.

3. The secondary APs in item 2 are full duplex capable, for example a secondary AP is capable of receiving while transmitting on the same channel.

4. The primary AP in item 2 may be full duplex capable.

5. Primary AP and secondary APs perform joint transmission to one or more non-AP STAs. (a) One spatial stream to a non-AP STA consists of signals from more than 1 AP.

6. Certain of the pilot signals in the PPDU of the joint transmission are transmitted only by the primary AP: (a) The pilot signal transmitted only by the primary AP is denoted as primary pilot. (b) There may be pilot signals transmitted by all AP participating in joint transmission. These pilots are denoted as non-primary pilots. (c) The receiving non-AP STA may use primary and/or non-primary pilots to perform phase tracking 7. A secondary AP may receive the primary pilot, and use the primary pilot to correct the clock drift between the primary AP's clock frequency and its own: (a) For example, a secondary AP may base clock correction on the estimated phase difference of primary pilots at different frequency tones, to determine the difference of the sampling times between primary AP and itself, and perform correction on the following symbol(s); and (b) For example, a secondary AP may base clock correction on the estimated phase difference of primary pilots at different symbols, to determine the difference of the carrier frequency between primary AP and itself, and performs correction on the following symbol(s).

8. A system in which a STAx MLD (multi-link device) may perform access on a channel (Ch2) which is CCA idle, when another channel (Ch1) is CCA busy: (a) STA x MLD may be an AP or non-AP MLD. In case the MLD is an AP MLD, the associated non-AP MLD may be required to monitor all enabled links (channels in this case) as in the case of an MLD operating on multiple bands. (b) Channel 1 (Ch1) and channel 2 (Ch2) are within the operation channels of the STAx MLD. The two channels may be neighboring channels of each other. Channel here means the frequency range that is associated with a channel number (e.g., channel 100 in 5 GHz band) and does not mean an individual OFDM tone. Neighboring indicates the distance of two channels in frequency separation is small. The neighboring channels indicated here do not need to be adjacent channels but close in frequency such that the legacy MLDs without FD capability cannot receive on one channel and transmit on another. (c) The STAs which are causing channel 1 (Ch1) to be CCA busy may be full duplex capable STA/MLDs.

9. STAx MLD may perform access on channel 2 (Ch2) with an initial message (initial msg), in which some or all OFDM symbols are extended OFDM symbols. The non-CP portion of an extended OFDM symbol has more than or equal to 2 symbols of non-CP portion of a regular OFDM symbol: (a) The extended OFDM symbol consists of time-domain continuous sinusoidal signals on different frequency tones. (b) For example, the non-Contention Period (non-CP) portion of the extended OFDM symbol is the non-CP portion of a regular OFDM symbol repeated twice in the time domain.

10. The initial message in item 9 signals a NAV information on channel 2 (Ch2) for the TXOP obtained by the STA x MLD on channel 2 (Ch2).

11. The addressed receiver of the initial message STA z may reply with a message 2 (msg 2) indicating a clear to send on channel 2 (Ch2) to STA x MLD.

12. STA z may be transmitting on channel 1 (Ch1). In this case STA z is full duplex capable and also an MLD.

13. Message 2 (msg 2) from the STA z in item 12 may indicate the timing of OFDM symbol on channel 1 (Ch1) transmitted by STA z. (a) The indication may be implicit. For example, the timing of OFDM symbol transmitted by STA z on channel 1 (Ch1) may be implicitly signaled based on a start/end time of a particular symbol of the message 2 (msg2) with a fixed offset.

14. Message 2 (msg2) transmitted by STA z in item 12 may have the same extended symbol structure as in initial message described in item 9, or as per item 15.

15. Message 2 (msg 2) transmitted by STA z in item 12 may have synchronized OFDM symbol boundaries as the transmitted symbols on channel 1. (a) An extended symbol structure is not used. (b) The STA z in item 12 may use the transmitted message 2 (msg 2) to determine the self-interference channel on channel 2 (Ch2).

16. The STA x may transmit a PPDU after receiving message 2 (msg 2) on channel 2 (Ch2), with Data OFDM symbols and training OFDM symbols for Data symbols aligned with what was indicated in item 13. (a) The PPDU may have padding signals before the Data OFDM symbols and/or training OFDM symbols for Data symbols.

17. The STAs in item 8c, may be based on its transmitting OFDM symbol timing on channel 1 (Ch1) to receive the initial message on channel 2 (Ch2), as follows. (a) For example, by using a window that guarantees the orthogonality between the transmitted signals on channel 1 (Ch1) and received signal on channel 2 (Ch2). (b) The STAs in item 8c, may include the addressed receiver of the initial message. (c) The STAs in item 8c, may include other STAs transmitting on channel 1 (Ch1) which are not addressed to the receiver of the initial message.

18. The STAs in item 8c may not utilize the same OFDM symbol timing.

19. The STAs in item 17c may use the initial message to update NAV on channel 2 (Ch2).

20. The STAs in item 8c may not need to perform a medium synchronization delay for accessing channel 2 (Ch2), at the time or after transmitting on channel 1, because they are aware of the NAV status of channel 2 (Ch2).

7. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (5) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following.

An apparatus for wireless communication in a network, the apparatus comprising: (a) a wireless communication circuit, station, which can be part of an access point (AP) configured for wirelessly communicating with other wireless stations (STAs) over a primary link and a secondary link in performing communication on a wireless local area network (WLAN) under an IEEE 802.11 protocol in which APs on the network operating as a primary AP and secondary APs perform joint transmissions to one or more non-AP stations; (b) a processor coupled to said wireless communication circuit for operating on the WLAN as a STA; (c) a non-transitory memory storing instructions executable by the processor; and (d) wherein said instructions, when executed by the processor, perform one or more steps for overcoming center frequency offset and symbol timing offset caused by residual drift comprising: (d)(i) transmitting pilot signals within an orthogonal frequency division multiplexing (OFDM) transmission, by an AP operating as a primary AP; (ii) wherein a portion of the overall set of pilot signals, as primary pilot signals, are only allowed to be transmitted by the primary AP, and not by APs operating as secondary APs; and (iii) wherein each said station operating as a secondary AP is configured with its own clock and upon receiving said pilot signals corrects its clock and the following symbols while performing joint transmission.

An apparatus for wireless communication in a network, the apparatus comprising: (a) a wireless communication circuit as a station, which can be part of an access point (AP) configured for wirelessly communicating with other wireless stations over a primary link/channel and a secondary link/channel within a single frequency band in performing communication on a wireless local area network (WLAN) under an IEEE 802.11 protocol; (b) a processor coupled to said wireless communication circuit for operating on the WLAN as a station; (c) a non-transitory memory storing instructions executable by the processor; and (d) wherein said instructions, when executed by the processor, perform one or more steps for using neighboring channels in a single radio band for simultaneous transmit and receive (STR) on primary and secondary channels comprising: (d)(i) transmitting an initial message sent with extended orthogonal frequency division multiplexing (OFDM) symbol(s) on the secondary channel to facilitate operation of a network allocation vector (NAV) decoding for stations transmitting on the primary channel; and (d)(ii) performing single band multi-link operations (MLOs) with OFDM symbol alignment between neighboring channels as different links.

An apparatus for wireless communication in a network, the apparatus comprising: (a) a wireless communication circuit, station, which can be part of an access point (AP) configured for wirelessly communicating with other wireless stations over a primary link and a secondary link in performing communication on a wireless local area network (WLAN) under an IEEE 802.11 protocol; (b) a processor coupled to said wireless communication circuit for operating on the WLAN as a station; (c) a non-transitory memory storing instructions executable by the processor; and (d) wherein said instructions, when executed by the processor, perform one or more steps comprising: (d)(i) allowing more than one AP to transmit a joint acknowledgement (Ack) or block acknowledgement (Ack/BA) to an uplink (UL) PPDU that is intended to a primary AP; and (d)(ii) determining receiver status difference between itself as a secondary AP and that of the primary AP, and said secondary AP forwards the data, which was received by itself but not by the primary AP, to the primary AP instead of requiring a non-AP to perform retransmission to the primary AP.

The apparatus or method or system of any preceding implementation, wherein the secondary AP bases its clock correction on estimated phase difference of primary pilots at different frequency tones, to determine the difference of sampling times between the primary AP and itself, and performs correction on the following symbol(s).

The apparatus or method or system of any preceding implementation, wherein the secondary AP bases its clock correction on estimated phase difference of primary pilots at different symbols, to determine a difference in carrier frequency between the primary AP and itself, and performs correction on the following symbol(s).

The apparatus or method or system of any preceding implementation, wherein an AP operating as a secondary AP is full duplex capable, while the primary AP is either full duplex or half duplex.

The apparatus or method or system of any preceding implementation, wherein a spatial stream to a non-AP STA comprises signals from multiple APs.

The apparatus or method or system of any preceding implementation, wherein APs, which are not the primary AP, are configured to send non-primary pilot signals in joint transmission.

The apparatus or method or system of any preceding implementation, wherein the station operating as a non-AP station is configured for utilizing received primary pilots to perform phase tracking.

The apparatus or method or system of any preceding implementation, wherein the primary AP transmits a trigger frame which is received by the secondary APs participating in the joint transmission; wherein said trigger frame establishes the center frequency and/or sampling rate of the joint transmission and synchronizing of the clocks between APs.

The apparatus or method or system of any preceding implementation, wherein said trigger frame contains instructions from the primary AP for precoding the data at the secondary AP for the spatial data stream.

The apparatus or method or system of any preceding implementation, wherein the primary and secondary APs precode data and send the spatial data stream and pilots jointly to the non-AP station.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit, station, which can be part of an access point (AP) configured for wirelessly communicating with other wireless stations (STAs) over a primary link and a secondary link in performing communication on a wireless local area network (WLAN) under an IEEE 802.11 protocol in which APs on the network operating as a primary AP and secondary APs perform joint transmissions to one or more non-AP stations;
   (b) a processor coupled to said wireless communication circuit for operating on the WLAN as a STA;
   (c) a non-transitory memory storing instructions executable by the processor; and
   (d) wherein said instructions, when executed by the processor, perform one or more steps for overcoming center frequency offset and symbol timing offset caused by residual drift comprising:
      (i) transmitting pilot signals within an orthogonal frequency division multiplexing (OFDM) transmission, by an AP operating as a primary AP;
      (ii) wherein a portion of the overall set of pilot signals, as primary pilot signals, are only allowed to be transmitted by the primary AP, and not by APs operating as secondary APs;
      (iii) wherein each said station operating as a secondary AP is configured with its own clock and upon receiving said pilot signals corrects its clock and the following symbols while performing joint transmission; and
      (iv) wherein the primary AP transmits a trigger frame which is received by the secondary APs participating in the joint transmission; wherein said trigger frame establishes the center frequency and/or sampling rate of the joint transmission and synchronizing of the clocks between APs.

2. The apparatus of claim 1, wherein the secondary AP bases its clock correction on estimated phase difference of primary pilots at different frequency tones, to determine the difference of sampling times between the primary AP and itself, and performs correction on the following symbol(s).

3. The apparatus of claim 1, wherein the secondary AP bases its clock correction on estimated phase difference of primary pilots at different symbols, to determine a difference in carrier frequency between the primary AP and itself, and performs correction on the following symbol(s).

4. The apparatus of claim 1, wherein an AP operating as a secondary AP is full duplex capable, while the primary AP is either full duplex or half duplex.

5. The apparatus of claim 1, wherein a spatial stream to a non-AP STA comprises signals from multiple APs.

6. The apparatus of claim 1, wherein APs, which are not the primary AP, are configured to send non-primary pilot signals in joint transmission.

7. The apparatus of claim 1, wherein the station operating as a non-AP station is configured for utilizing received primary pilots to perform phase tracking.

8. The apparatus of claim 1, wherein said trigger frame contains instructions from the primary AP for precoding the data at the secondary AP for the spatial data stream.

9. The apparatus of claim 1, wherein the primary and secondary APs precode data and send the spatial data stream and pilots jointly to the non-AP station.

10. An apparatus for wireless communication in a network, the apparatus comprising:
    (a) a wireless communication circuit as a station, which can be part of an access point (AP) configured for wirelessly communicating with other wireless stations over a primary link/channel and a secondary link/channel within a single frequency band in performing communication on a wireless local area network (WLAN) under an IEEE 802.11 protocol;
    (b) a processor coupled to said wireless communication circuit for operating on the WLAN as a station;
    (c) a non-transitory memory storing instructions executable by the processor; and
    (d) wherein said instructions, when executed by the processor, perform one or more steps for using neighboring channels in a single radio band for simultaneous transmit and receive (STR) on primary and secondary channels comprising:
       (i) transmitting an initial message sent with extended orthogonal frequency division multiplexing (OFDM) symbol(s) on the secondary channel to facilitate operation of a network allocation vector (NAV) decoding for stations transmitting on the primary channel; (ii) performing single band multi-link operations (MLOs) with OFDM symbol alignment between neighboring channels as different links; and
       (iii) wherein the primary AP transmits a trigger frame which is received by the secondary APs participating in the joint transmission; wherein said trigger frame establishes the center frequency and/or sampling rate of the joint transmission and synchronizing of the clocks between APs.

11. An apparatus for wireless communication in a network, the apparatus comprising:
    (a) a wireless communication circuit, station, which can be part of an access point (AP) configured for wirelessly communicating with other wireless stations over a primary link and a secondary link in performing communication on a wireless local area network (WLAN) under an IEEE 802.11 protocol;
    (b) a processor coupled to said wireless communication circuit for operating on the WLAN as a station;
    (c) a non-transitory memory storing instructions executable by the processor; and
    (d) wherein said instructions, when executed by the processor, perform one or more steps comprising:
       (i) allowing more than one AP to transmit a joint acknowledgement (Ack) or block acknowledgement (Ack/BA) to an uplink (UL) PPDU that is intended to a primary AP;
       (ii) determining receiver status difference between itself as a secondary AP and that of the primary AP, and said secondary AP forwards the data, which was received by itself but not by the primary AP, to the primary AP instead of requiring a non-AP to perform retransmission to the primary AP; and
       (iii) transmitting a trigger frame, by the primary AP, which is received by the secondary APs participating in the joint transmission; wherein said trigger frame establishes the center frequency and/or sampling rate of the joint transmission and synchronizing of the clocks between APs.

* * * * *